US010939315B2

(12) United States Patent
Wang et al.

(10) Patent No.: US 10,939,315 B2
(45) Date of Patent: Mar. 2, 2021

(54) CHANNEL STATE INFORMATION (CSI) OBTAINING METHOD AND APPARATUS

(71) Applicant: Huawei Technologies Co., Ltd., Shenzhen (CN)

(72) Inventors: Ting Wang, Shanghai (CN); Shengyue Dou, Shanghai (CN); Yuanjie Li, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/371,927

(22) Filed: Apr. 1, 2019

(65) Prior Publication Data

US 2019/0230549 A1 Jul. 25, 2019

Related U.S. Application Data

(63) Continuation of application No. PCT/CN2017/103925, filed on Sep. 28, 2017.

(30) Foreign Application Priority Data

Sep. 30, 2016 (CN) ........................ 201610878533.9
Mar. 25, 2017 (CN) ........................ 201710184954.6

(51) Int. Cl.
*H04W 24/10* (2009.01)
*H04L 1/00* (2006.01)
(Continued)

(52) U.S. Cl.
CPC ............ *H04W 24/10* (2013.01); *H04B 7/024* (2013.01); *H04B 7/0417* (2013.01);
(Continued)

(58) Field of Classification Search
CPC ..... H04L 1/0026; H04L 5/001; H04L 5/0091; H04L 24/00; H04L 24/10; H04L 5/0035;
(Continued)

(56) References Cited

U.S. PATENT DOCUMENTS

2012/0327981 A1* 12/2012 Sayana ................ H04L 5/0094
375/219
2013/0196675 A1 8/2013 Xiao et al.
(Continued)

FOREIGN PATENT DOCUMENTS

CN 102300244 A 12/2011
CN 103313294 A 9/2013
(Continued)

OTHER PUBLICATIONS

"Consideration on signaling of the bandwidth information for CSI-RS," 3GPP TSG-RAN WG1 #69, Prague, Czech Republic, pp. 1-3, 3rd Generation Partnership Project, Valbonne, France (May 21-25, 2012).

(Continued)

*Primary Examiner* — Mewale A Ambaye
(74) *Attorney, Agent, or Firm* — Leydig, Voit & Mayer, Ltd.

(57) ABSTRACT

A CSI measurement method and apparatus are described. The CSI measuring includes obtaining CSI configuration information that includes first frequency-domain indication information and that is sent by a second network device, where the CSI configuration information instructs the first network device to perform a CSI measurement, and the first frequency-domain indication information indicates a frequency-domain location in which the first network device performs CSI measurement. The CSI measuring includes measuring, based on the CSI configuration information, a reference signal in the frequency-domain location indicated by the first frequency-domain indication information. The CSI measurement is sent to a network device, so that a reference signal in a specific frequency-domain location in channel bandwidth is measured.

19 Claims, 10 Drawing Sheets

S3001

A terminal receives second information from a base station, where the second information includes frequency-domain information of CSI channel measurement, and there is a correspondence between the frequency domain information of the CSI interference measurement and the frequency-domain information of the CSI channel measurement

S3002

The terminal determines the frequency-domain information of the CSI interference measurement based on the frequency-domain information of the CSI channel measurement, and measures interference on a CSI interference measurement resource in a frequency-domain location corresponding to the frequency-domain information of the CSI interference measurement

(51) Int. Cl.

| | |
|---|---|
| ***H04B 7/06*** | (2006.01) |
| ***H04B 7/0417*** | (2017.01) |
| ***H04B 7/024*** | (2017.01) |
| ***H04L 5/00*** | (2006.01) |

(52) U.S. Cl.
CPC ......... *H04B 7/0617* (2013.01); *H04B 7/0626* (2013.01); *H04B 7/0632* (2013.01); *H04B 7/0639* (2013.01); *H04L 1/0026* (2013.01); *H04L 5/0048* (2013.01); *H04L 5/0057* (2013.01)

(58) Field of Classification Search
CPC ... H04L 5/0048; H04L 5/0051; H04L 5/0053; H04L 5/0057
See application file for complete search history.

(56) References Cited

U.S. PATENT DOCUMENTS

| | | | | |
|---|---|---|---|---|
| 2013/0260741 | A1* | 10/2013 | Yamada | H04L 1/0026 455/422.1 |
| 2014/0071931 | A1* | 3/2014 | Lee | H04L 5/001 370/329 |
| 2014/0126402 | A1* | 5/2014 | Nam | H04B 7/0632 370/252 |
| 2015/0117345 | A1* | 4/2015 | Kim | H04L 5/005 370/329 |
| 2015/0124717 | A1 | 5/2015 | Li et al. | |
| 2015/0139105 | A1 | 5/2015 | Guo et al. | |
| 2015/0146634 | A1* | 5/2015 | Hwang | H04L 1/0026 370/329 |
| 2016/0013906 | A1 | 1/2016 | Guo et al. | |
| 2016/0227428 | A1 | 8/2016 | Novlan et al. | |
| 2016/0234762 | A1* | 8/2016 | You | H04W 48/16 |
| 2017/0034727 | A1 | 2/2017 | Li et al. | |
| 2018/0091208 | A1 | 3/2018 | Mazzarese et al. | |

FOREIGN PATENT DOCUMENTS

| | | | |
|---|---|---|---|
| CN | 103918345 | A | 7/2014 |
| CN | 104038320 | A | 9/2014 |
| CN | 104081813 | A | 10/2014 |
| CN | 104935389 | A | 9/2015 |
| EP | 2779781 | A1 | 9/2014 |
| EP | 2854441 | A1 | 4/2015 |
| WO | 2014069956 | A1 | 5/2014 |
| WO | 2016072784 | A1 | 5/2016 |

OTHER PUBLICATIONS

"Resources for Interference Measurements," 3GPP TSG-RAN WG1 #68, Dresden, Germany, pp. 1-10, Feb. 10, 2012, 3rd Generation Partnership Project, Valbonne, France (Feb. 6-10, 2012).

"Remaining issues of new aperiodic PUSCH feedback mode," 3GPP TSG-RAN WG1 #73, Fukuoka, Japan, pp. 1-3, 3rd Generation Partnership Project, Valbonne, France (May 20-24, 2013).

"3rd Generation Partnership Project; Technical Specification Group Radio Access Network; Evolved Universal Terrestrial Radio Access (E-UTRA); Radio Resource Control (RRC); Protocol specification(Release 13)," 3GPP TS 36.331 V13.0.0, pp. 1-507, 3rd Generation Partnership Project, Valbonne, France (Dec. 2015).

"3rd Generation Partnership Project; Technical Specification Group Radio Access Network; Evolved Universal Terrestrial Radio Access (E-UTRA); Physical channels and modulation(Release 14)," 3GPP TS 36.211 V14.0.0, pp. 1-170, 3rd Generation Partnership Project, Valbonne, France (Sep. 2016).

"3rd Generation Partnership Project; Technical Specification Group Radio Access Network; Evolved Universal Terrestrial Radio Access (E-UTRA); Physical layer procedures(Release 13)," 3GPP TS 36.213 V13.0.1, pp. 1-326, (Jan. 2016).

* cited by examiner

CHANNEL STATE INFORMATION (CSI) OBTAINING METHOD AND APPARATUS

CROSS-REFERENCE TO RELATED APPLICATIONS

This application is a continuation of International Application No. PCT/CN2017/103925, filed on Sep. 28, 2017, which claims priority to Chinese Patent Application No. 201710184954.6, filed on Mar. 25, 2017 and Chinese Patent Application No. 201610878533.9, filed on Sep. 30, 2016. The disclosures of all of the aforementioned patent applications are hereby incorporated by reference in their entireties.

TECHNICAL FIELD

Embodiments of this application relate to the field of communications technologies, and in particular, to a channel state information (CSI) measurement method and apparatus.

BACKGROUND

As mobile communications technologies develop towards a high speed and a large data service volume, a next-generation mobile communications system requires large-capacity and high-quality data transmission. A multiple-input multiple-output, (MIMO), technology is considered as one of key technologies that can implement future high-speed data transmission, and has a broad application prospect in 4th Generation (4G) and 5th Generation (5G) mobile communications systems. A plurality of transmit antennas in a conventional centralized MIMO system are centralized on a base station (BS) side. Different from those in centralized MIMO, a plurality of transmit antennas in a distributed MIMO system are distributed in different geographic locations. Different pairs of receive/transmit links of the distributed MIMO system are more independent of each other. The distributed MIMO system has advantages such as a large capacity, low power consumption, better coverage, and low electromagnetic damage to human body, and is considered as one of alternative solutions for a future wireless communications system.

In distributed MIMO, coordinated multipoint transmission (CoMP) is considered as an effective method for addressing inter-cell interference and improving an edge user throughput. In a CoMP technology, joint processing may be performed for a plurality of neighboring cells, or edge users may be coordinated, to avoid interference and improve the edge user throughput. Downlink CoMP technologies mainly include joint transmission (JT), coordinated scheduling (CS) and coordinated beamforming (CB), and dynamic point selection (DPS)/dynamic point blanking (DPB). JT is classified into coherent JT and incoherent JT. To implement the CoMP scheduling, a serving base station needs to know a condition of a downlink channel from each station to a target user.

AnLong Term Evolution (LTE) specification provides a reference signal: a channel state information-reference signal (CSI-RS). A terminal estimates a channel interference status by measuring a specific CSI-RS, to obtain channel state information interference measurement (CSI-IM) information, and reports the CSI-IM information to a serving base station through a physical uplink control channel (PUCCH). To configure the terminal to receive and process the specific CSI-RS and provide required feedback information, the base station provides an indication to the terminal by configuring higher layer radio resource control (RRC) signaling. However, in JT, which is one of CoMP technologies, a plurality of cells are simultaneously scheduled to transmit data for one user. This causes different interference statuses in different frequency-domain locations. Alternatively, in 5G different types of data are transmitted in different frequency-domain locations. This also causes different interference statuses in different frequency-domain locations. In the prior art, CSI-IM and CSI rate matching are usually configured based on full bandwidth, and an interference status in a specific frequency-domain location of bandwidth cannot be measured.

SUMMARY

This application provides a CSI measurement method, to overcome a prior-art problem that CSI-IM and CSI rate matching are usually configured based on full bandwidth, and an interference status in a specific frequency-domain location of bandwidth cannot be measured.

According to a first aspect of embodiments of this application, a CSI measurement method is provided, including: obtaining, by a first network device, CSI configuration information that includes first frequency-domain indication information and that is sent by a second network device, where the CSI configuration information is used to instruct the first network device to perform CSI measurement, and the first frequency-domain indication information is used to indicate a frequency-domain location in which the first network device performs CSI measurement; and measuring, by the first network device based on the CSI configuration information, a reference signal in the frequency-domain location indicated by the first frequency-domain indication information, to obtain CSI.

Optionally, the first frequency-domain indication information includes channel division information, and the channel division information is used to indicate a manner of dividing channel bandwidth into a plurality of resource blocks.

Optionally, the method further includes: dividing, by the first network device, the channel bandwidth into the plurality of resource blocks in a preset division manner.

Optionally, the first frequency-domain indication information includes a frequency-domain measurement identifier corresponding to each of the plurality of resource blocks of the channel bandwidth; and the measuring a reference signal in the frequency-domain location indicated by the first frequency-domain indication information includes: obtaining, by the first network device, the frequency-domain measurement identifier corresponding to each of the plurality of resource blocks of the channel bandwidth, where the frequency-domain measurement identifier includes a first measurement identifier and a second measurement identifier; and measuring, by the first network device, a reference signal on a resource block whose frequency-domain measurement identifier in the channel bandwidth is the first measurement identifier.

Optionally, the first frequency-domain indication information includes an information identifier of a to-be-measured resource block; and the measuring a reference signal in the frequency-domain location indicated by the first frequency-domain indication information includes: obtaining, by the first network device, the information identifier of the to-be-measured resource block, where the information identifier is used to indicate a frequency-domain location of a measurement resource; and measuring, by the first network device, a reference signal on a resource block corresponding to the frequency-domain location.

Optionally, the obtaining, by a first network device, CSI configuration information that includes first frequency-domain indication information and that is sent by a second network device includes: obtaining, by the first network device by using radio resource control RRC or physical layer signaling, the CSI configuration information that includes the first frequency-domain indication information and that is sent by the second network device.

Optionally, the reference signal includes a channel measurement reference signal and/or an interference measurement reference signal.

Optionally, the method further includes: sending, by the first network device, the obtained CSI to the second network device, where the obtained CSI includes:

CSI that is corresponding to a target resource block in the plurality of resource blocks and that is obtained by the first network device; or CSI that is obtained by the first network device by obtaining CSI corresponding to a target resource block in the plurality of resource blocks, and processing, in a preset manner, the CSI corresponding to the target resource block.

According to a second aspect of embodiments of this application, a CSI measurement method is provided, including: sending, by a second network device to a first network device, CSI configuration information that includes first frequency-domain indication information, where the CSI configuration information is used to instruct the first network device to perform CSI measurement, and the first frequency-domain indication information is used to indicate a frequency-domain location in which the first network device performs CSI measurement, so that the first network device measures, based on the CSI configuration information, a reference signal in the frequency-domain location indicated by the first frequency-domain indication information.

Optionally, the first frequency-domain indication information includes channel division information, and the channel division information is used to indicate a manner of dividing channel bandwidth into a plurality of resource blocks.

Optionally, the method further includes: dividing, by the second network device, the channel bandwidth into the plurality of resource blocks in a preset division manner.

Optionally, the first frequency-domain indication information includes a frequency-domain measurement identifier corresponding to each of the plurality of resource blocks of the channel bandwidth.

Optionally, the frequency-domain measurement identifier includes a first measurement identifier and a second measurement identifier, the first measurement identifier is used to instruct the first network device to measure a reference signal on a resource block whose frequency-domain measurement identifier in the channel bandwidth is the first measurement identifier, and the second measurement identifier is used to instruct the first network device not to measure a reference signal on a resource block whose frequency-domain measurement identifier in the channel bandwidth is the second measurement identifier.

According to a third aspect of embodiments of this application, a CSI measurement method is provided, including: sending, by a second network device to a first network device, CSI configuration information that includes first frequency-domain indication information, where the CSI configuration information is used to instruct the first network device to perform CSI measurement, and the first frequency-domain indication information is used to indicate a frequency-domain location in which the first network device performs CSI measurement, so that the first network device measures, based on the CSI configuration information, a reference signal in the frequency-domain location indicated by the first frequency-domain indication information. The first frequency-domain indication information includes an information identifier of a to-be-measured resource block, so that the first network device measures a corresponding resource block of the channel bandwidth based on the information identifier.

Optionally, the sending, by a second network device to a first network device, CSI configuration information that includes first frequency-domain indication information includes: sending, by the second network device to the first network device by using radio resource control RRC or physical layer signaling, the CSI configuration information that includes the first frequency-domain indication information.

Optionally, the reference signal includes a channel measurement reference signal and/or an interference measurement reference signal.

The method further includes: obtaining, by the second network device, CSI sent by the first network device, where the CSI includes: CSI that is corresponding to a target resource block in the plurality of resource blocks and that is obtained by the first network device; or CSI that is obtained by the first network device by obtaining CSI corresponding to a target resource block in the plurality of resource blocks, and processing, in a preset manner, the CSI corresponding to the target resource block.

According to a fourth aspect of embodiments of this application, a rate matching method is provided, including: obtaining, by a first network device, rate configuration information that includes second frequency-domain indication information and that is sent by a second network device, where the rate configuration information is used to instruct the first network device to perform rate matching, and the second frequency-domain indication information is used to indicate a frequency-domain location in which the first network device performs rate matching; determining, by the first network device based on the rate configuration information, a resource location of a reference signal in the frequency-domain location corresponding to the second frequency-domain indication information; and performing, by the first network device, rate matching on received data based on the resource location.

Optionally, the second frequency-domain indication information includes channel division information, and the channel division information is used to indicate a manner of dividing channel bandwidth into a plurality of resource blocks.

Optionally, the method further includes: dividing, by the first network device, the channel bandwidth into the plurality of resource blocks in a preset division manner.

Optionally, the second frequency-domain indication information includes: each of the plurality of resource blocks of the channel bandwidth is corresponding to one rate matching identifier; and the determining a resource location of a reference signal in the frequency-domain location corresponding to the second frequency-domain indication information includes: obtaining, by the first network device, the rate matching identifier corresponding to each of the plurality of resource blocks of the channel bandwidth, where the rate matching identifier includes a first rate matching identifier and a second rate matching identifier; and determining, by the first network device, a resource location of a reference signal on a resource block whose rate matching identifier in the channel bandwidth is the first rate matching identifier.

Optionally, the second frequency-domain indication information includes an information identifier of a resource block on which rate matching is to be performed; and the determining a resource location of a reference signal in the frequency-domain location corresponding to the second frequency-domain indication information includes: obtaining, by the first network device, the information identifier of the resource block on which rate matching is to be performed, where the information identifier includes a frequency-domain location; and determining, by the first network device, a resource location of a reference signal on a resource block corresponding to the frequency-domain location.

Optionally, the obtaining, by a first network device, rate configuration information that includes second frequency-domain indication information and that is sent by a second network device includes: obtaining, by the first network device by using radio resource control RRC or physical layer signaling, the rate configuration information that includes the second frequency-domain indication information and that is sent by the second network device.

According to a fifth aspect of embodiments of this application, a rate matching method is provided, including: sending, by a second network device to a first network device, rate configuration information that includes second frequency-domain indication information, where the rate configuration information is used to instruct the first network device to perform rate matching, and the second frequency-domain indication information is used to indicate a frequency-domain location in which the first network device performs rate matching, so that the first network device determines, based on the rate configuration information, a resource location of a reference signal in the frequency-domain location corresponding to the second frequency-domain indication information, and performs rate matching on received data based on the resource location.

Optionally, the second frequency-domain indication information includes channel division information, and the channel division information is used to indicate a manner of dividing channel bandwidth into a plurality of resource blocks.

Optionally, the second frequency-domain indication information includes: each of the plurality of resource blocks of the channel bandwidth is corresponding to one rate matching identifier.

Optionally, the rate matching identifier includes a first rate matching identifier and a second measurement identifier, the first measurement identifier is used to instruct the first network device to perform rate matching on data on a resource block whose rate matching identifier in the channel bandwidth is the first measurement identifier, and the second measurement identifier is used to instruct the first network device not to perform rate matching on data on a resource block whose rate matching identifier in the channel bandwidth is the second measurement identifier.

Optionally, the second frequency-domain indication information includes an information identifier of a resource block on which rate matching is to be performed.

Optionally, the information identifier includes a frequency-domain location, and the information identifier is used to instruct the first network device to determine a resource location of a reference signal on a resource block corresponding to the frequency-domain location, and instruct the first network device to perform rate matching on received data based on the resource location.

Optionally, the sending, by a second network device to a first network device, rate configuration information that includes second frequency-domain indication information includes: sending, by the second network device to the first network device by using radio resource control RRC or physical layer signaling, the rate configuration information that includes the second frequency-domain indication information.

According to a sixth aspect of embodiments of this application, a channel state information CSI measurement apparatus is provided, including: a receiving unit, configured to obtain CSI configuration information that includes first frequency-domain indication information and that is sent by a second network device, where the CSI configuration information includes the first frequency-domain indication information, the CSI configuration information is used to instruct a first network device to perform CSI measurement, and the first frequency-domain indication information is used to indicate a frequency-domain location in which the first network device performs CSI measurement; and a processing unit, configured to measure, based on the CSI configuration information, a reference signal in the frequency-domain location indicated by the first frequency-domain indication information.

The first frequency-domain indication information includes channel division information, and the channel division information is used to indicate a manner of dividing channel bandwidth into a plurality of resource blocks.

Optionally, the first frequency-domain indication information includes channel division information, and the channel division information is used to indicate a manner of dividing channel bandwidth into a plurality of resource blocks.

Optionally, the processing unit is further configured to divide channel bandwidth into a plurality of resource blocks in a preset division manner.

Optionally, the first frequency-domain indication information includes a frequency-domain measurement identifier corresponding to each of the plurality of resource blocks of the channel bandwidth.

The processing unit is further configured to obtain the frequency-domain measurement identifier corresponding to each of the plurality of resource blocks of the channel bandwidth, where the frequency-domain measurement identifier includes a first measurement identifier and a second measurement identifier; and the processing unit is further configured to measure a reference signal on a resource block whose frequency-domain measurement identifier in the channel bandwidth is the first measurement identifier.

Optionally, the first frequency-domain indication information includes an information identifier of a to-be-measured resource block; the processing unit is further configured to obtain the information identifier of the to-be-measured resource block, where the information identifier is used to indicate a frequency-domain location of a measurement resource; and the processing unit is further configured to measure a reference signal on a resource block corresponding to the frequency-domain location.

Optionally, the receiving unit is configured to obtain, by using radio resource control RRC or physical layer signaling, the CSI configuration information that includes the first frequency-domain indication information and that is sent by the second network device.

Optionally, the apparatus further includes: a sending unit, configured to send obtained CSI to the second network device, where the obtained CSI includes:

CSI that is corresponding to a target resource block in the plurality of resource blocks and that is obtained by the first network device; or CSI that is obtained by the first network device by obtaining CSI corresponding to a target resource block in the plurality of resource blocks, and processing, in a preset manner, the CSI corresponding to the target resource block.

According to a seventh aspect of embodiments of this application, a channel state information CSI measurement apparatus is provided, including: a sending unit, configured to send, to a first network device, CSI configuration information that includes first frequency-domain indication information, where the CSI configuration information is used to instruct the first network device to perform CSI measurement, and the first frequency-domain indication information is used to indicate a frequency-domain location in which the first network device performs CSI measurement, so that the first network device measures, based on the CSI configuration information, a reference signal in the frequency-domain location indicated by the first frequency-domain indication information.

Optionally, the first frequency-domain indication information includes channel division information, and the channel division information is used to indicate a manner of dividing channel bandwidth into a plurality of resource blocks.

Optionally, the apparatus further includes a processing unit, configured to divide channel bandwidth into a plurality of resource blocks in a preset division manner.

Optionally, the first frequency-domain indication information includes a frequency-domain measurement identifier corresponding to each of the plurality of resource blocks of the channel bandwidth.

Optionally, the frequency-domain measurement identifier includes a first measurement identifier and a second measurement identifier, the processing unit is further configured to instruct the first network device to measure a reference signal on a resource block whose frequency-domain measurement identifier in the channel bandwidth is the first measurement identifier; and the processing unit is further configured to instruct the first network device not to measure a reference signal on a resource block whose frequency-domain measurement identifier in the channel bandwidth is the second measurement identifier.

Optionally, the first frequency-domain indication information includes an information identifier of a to-be-measured resource block, so that the first network device measures a corresponding resource block of the channel bandwidth based on the information identifier.

Optionally, the sending unit is further configured to send, to the first network device by using radio resource control RRC or physical layer signaling, the CSI configuration information that includes the first frequency-domain indication information.

Optionally, the sending unit is configured to obtain CSI sent by the first network device.

The CSI includes: CSI that is corresponding to a target resource block in the plurality of resource blocks and that is obtained by the first network device; or CSI that is obtained by the first network device by obtaining CSI corresponding to a target resource block in the plurality of resource blocks, and processing, in a preset manner, the CSI corresponding to the target resource block.

According to another aspect of embodiments of this application, an interference measurement method is provided, including: receiving, by a terminal, first information from a base station, where the first information includes frequency-domain information of CSI interference measurement, and there is a correspondence between the frequency-domain information of the CSI interference measurement and frequency-domain information of CSI channel measurement; and measuring, by the terminal based on the frequency-domain information of the CSI interference measurement, interference on a CSI interference measurement resource in a frequency-domain location corresponding to the frequency-domain information of the CSI interference measurement.

In a possible design provided in the embodiments of this application, the first information is CSI configuration information, the CSI configuration information includes the frequency-domain information of the CSI channel measurement, and the frequency-domain information of the CSI channel measurement and/or the frequency-domain information of the CSI interference measurement are subsets of full bandwidth or is a subset of full bandwidth.

According to another aspect of embodiments of this application, an interference measurement method is provided, including: determining, by a base station, frequency-domain information of CSI interference measurement, where there is a correspondence between the frequency-domain information of the CSI interference measurement and frequency-domain information of CSI channel measurement; and sending, by the base station, first information to a terminal, where the first information includes the frequency-domain information of the CSI interference measurement.

In a possible design provided in the embodiments of this application, the frequency-domain information of the CSI channel measurement and the frequency-domain information of the CSI interference measurement are subsets of full bandwidth, the frequency-domain information of the CSI channel measurement or the frequency-domain information of the CSI interference measurement is subsets of full bandwidth.

According to another aspect of embodiments of this application, an interference measurement method is provided, including: receiving, by a terminal, second information from a base station, where the second information includes frequency-domain information of CSI channel measurement, and there is a correspondence between frequency-domain information of the CSI interference measurement and the frequency-domain information of the CSI channel measurement; and determining, by the terminal, the frequency-domain information of the CSI interference measurement based on the frequency-domain information of the CSI channel measurement, and measuring interference on a CSI interference measurement resource in a frequency-domain location corresponding to the frequency-domain information of the CSI interference measurement.

In a possible design provided in the embodiments of this application, the frequency-domain information of the CSI channel measurement and the frequency-domain information of the CSI interference measurement are subsets of full bandwidth, the frequency-domain information of the CSI channel measurement or the frequency-domain information of the CSI interference measurement is subsets of full bandwidth.

According to another aspect of embodiments of this application, an interference measurement method is provided, including: obtaining, by a base station, frequency-domain information of CSI channel measurement; and sending, by the base station, second information to terminal, where the second information includes the frequency-domain information of the CSI channel measurement, and there is a correspondence between frequency-domain information of the CSI interference measurement and the frequency-domain information of the CSI channel measurement.

In a possible design provided in the embodiments of this application, the frequency-domain information of CSI interference measurement and/or the frequency-domain information of the CSI channel measurement are subsets of full bandwidth or is a subset of full bandwidth.

According to another aspect of embodiments of this application, an interference measurement apparatus is provided, including: a transceiver unit, configured to receive first information from a base station, where the first information includes frequency-domain information of CSI interference measurement, and there is a correspondence between the frequency-domain information of the CSI interference measurement and frequency-domain information of CSI channel measurement; and a processing unit, configured to measure, based on the frequency-domain information of the CSI interference measurement, interference on a CSI interference measurement resource in a frequency-domain location corresponding to the frequency-domain information of the CSI interference measurement.

In a possible design provided in the embodiments of this application, the first information is CSI configuration information, the CSI configuration information includes the frequency-domain information of the CSI channel measurement, and the frequency-domain information of the CSI channel measurement and/or the frequency-domain information of the CSI interference measurement are subsets of full bandwidth or is a subset of full bandwidth.

According to another aspect of embodiments of this application, an interference measurement apparatus is provided, including: a processing unit, configured to determine frequency-domain information of CSI interference measurement, where there is a correspondence between the frequency-domain information of the CSI interference measurement and frequency-domain information of CSI channel measurement; and a transceiver unit, configured to send first information to a terminal, where the first information includes the frequency-domain information of the CSI interference measurement.

In a possible design provided in the embodiments of this application, the frequency-domain information of the CSI channel measurement and/or the frequency-domain information of the CSI interference measurement are subsets of full bandwidth or is a subset of full bandwidth.

According to another aspect of embodiments of this application, an interference measurement apparatus is provided, including: a transceiver unit, configured to receive second information from a base station, where the second information includes frequency-domain information of CSI channel measurement, and there is a correspondence between frequency-domain information of the CSI interference measurement and the frequency-domain information of the CSI channel measurement; and a processing unit, configured to: determine the frequency-domain information of the CSI interference measurement based on the frequency-domain information of the CSI channel measurement, and measure interference on a CSI interference measurement resource in a frequency-domain location corresponding to the frequency-domain information of the CSI interference measurement.

In a possible design provided in the embodiments of this application, the frequency-domain information of CSI interference measurement and/or the frequency-domain information of the CSI channel measurement are subsets of full bandwidth or is a subset of full bandwidth.

According to another aspect of embodiments of this application, an interference measurement apparatus is provided, including: a processing unit, configured to obtain frequency-domain information of CSI channel measurement; and a transceiver unit, configured to send second information to terminal, where the second information includes the frequency-domain information of the CSI channel measurement, and there is a correspondence between frequency-domain information of the CSI interference measurement and the frequency-domain information of the CSI channel measurement.

In a possible design provided in the embodiments of this application, the frequency-domain information of CSI interference measurement and the frequency-domain information of the CSI channel measurement are subsets of full bandwidth.

In a possible design provided in the embodiments of this application, that there is a correspondence between the frequency-domain information of the CSI interference measurement and frequency-domain information of CSI channel measurement includes: the frequency-domain information of the CSI interference measurement is the same as the frequency-domain information of the CSI channel measurement; or the frequency-domain information of the CSI interference measurement is partially the same as the frequency-domain information of the CSI channel measurement; or the frequency-domain information of the CSI interference measurement is different from the frequency-domain information of the CSI channel measurement.

In a possible design provided in the embodiments of this application, the CSI interference measurement resource includes a non-zero power channel state information-reference signal NZP CSI-RS resource and/or a zero power channel state information-reference signal ZP CSI-RS resource.

In a possible design provided in the embodiments of this application, a subset of the full bandwidth includes N resource units, and N is greater than or equal to 1, and is less than a total quantity of resource units of the full bandwidth; or a subset of the full bandwidth includes M subbands, and M is greater than or equal to 1, and is less than a total quantity of subbands of the full bandwidth.

In a possible design provided in the embodiments of this application, the CSI channel measurement includes one or a combination of the following: channel quality indicator CQI measurement, precoding matrix indicator PMI measurement, rank indication RI measurement, and CRI measurement. It should be understood that the foregoing general descriptions and the following detailed descriptions are merely examples and explanations, and shall not be construed as a limitation on this application.

BRIEF DESCRIPTION OF DRAWINGS

The accompanying drawings herein are incorporated into the specification, constitute a part of the specification, show embodiments of this application, and are used to explain a principle of this application together with the specification.

DESCRIPTION OF EMBODIMENTS

The following describes the embodiments of this application with reference to accompanying drawings.

In a related technology, when CSI-IM is performed, a CSI process (process) is usually configured for a terminal of a serving cell by using a base station of the serving cell according to an existing protocol, so that the terminal performs CSI-IM according to the CSI process configured by the base station. However, the CSI process configured by the serving cell for the terminal is usually measurement based on entire channel bandwidth. In this way, even if the terminal finds, through measurement, that there is interference information in the channel bandwidth, the terminal cannot determine a specific frequency band, in which the interference information is located in, of the channel bandwidth. In addition, usually, there is interference information in some frequency bands of the channel bandwidth, and there is no interference information in some other frequency bands. If the terminal performs CSI-IM on the entire bandwidth, the terminal performs measurement according to the CSI process configured by the serving cell for the terminal, thereby causing a waste of resources.

Figure 1:
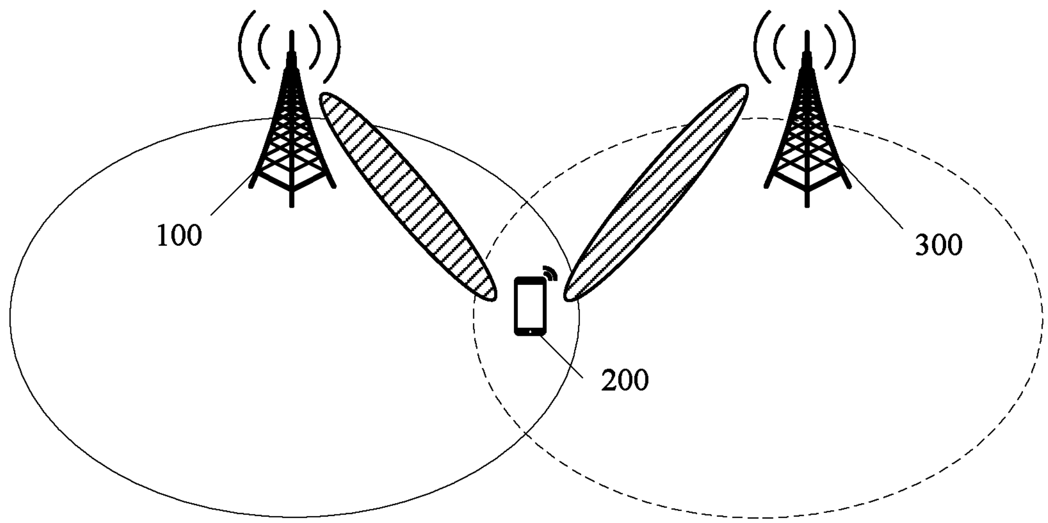
FIG. 1 is a schematic diagram of an application scenario according to an example embodiment.

For example, as shown in FIG. 1, a terminal simultaneously communicates with a transmission point TP 1 and a transmission point TP 2 by using a CoMP technology. In this case, there is a communication channel between the terminal and the TP 1, and there is also a communication channel between the terminal and the TP 2. The terminal needs to separately perform CSI-IM on channel bandwidth of the two communication channels, to separately obtain optimal scheduling subbands of the channel bandwidth of the two communication channels, so that the TP 1 and the TP 2 each communicate with the terminal by using a corresponding optimal subband. However, the two communication channels may overlap, causing mutual interference between the two communication channels. As a result, different subbands of the two communication channels are also subject to different degrees of interference, and a measurement result obtained after the terminal performs CSI-IM in the related technology may be inaccurate. In addition, the CSI-IM performed on the full bandwidth in the related technology also causes large pilot overheads and a waste of resources.

Therefore, to resolve a problem in the related technology that CSI-IM cannot be accurately performed on channel bandwidth and resources are wasted in a measurement process, the embodiments of this application provide a CSI measurement method and apparatus. A CSI measurement process in the embodiments of this application may be applied to communication processes between terminals, between a terminal and a base station, between base stations, and the like. The embodiments of this application are not limited thereto. For ease of understanding, this application is described by using communication between a terminal and a base station as an example.

A first network device and a second network device are explained and described below.

An example for a network device may be a base station or another type of transmission point device. Certainly, the network device is not limited to the foregoing two types of devices. For example, the second network device may alternatively be a terminal that can implement a configuration operation for another terminal.

The base station may be an evolved NodeB (eNB or e-NodeB), a macro base station, a micro base station (also referred to as a "small cell"), a pico cell, an access point (AP), a transmission point (TP), or the like in an LTE system or an evolved LTE system; or may be a base station in a future network, for example, a base station in a 5G network.

In the embodiments of this application, the terminal may also be referred to as user equipment (UE), or may be referred to as a terminal a mobile station (MS), a mobile terminal, or the like. The terminal may communicate with one or more core networks through a radio access network (RAN). For example, the terminal may be a mobile phone (or referred to as a "cellular" phone) or a computer with a mobile terminal. For example, the terminal may also be a portable, pocket-sized, handheld, computer built-in, or in-vehicle mobile apparatus, which exchanges voice and/or data with the radio access network. The terminal in the embodiments of this application may also be a device-to-device (D2D) terminal or an machine-to-machine (M2M) terminal.

As shown in FIG. 1, a base station 100 and a base station 300 simultaneously communicate with the terminal 200. In a mobility management and communication process of the terminal 200, performing, by the terminal 200, CSI-IM, and reporting a measurement result to the base station 100 and/or the base station 300 is an important manner of assisting the base stations in performing handover decision. This embodiment is described by using CSI measurement on channel bandwidth between the terminal 200 and the base station 100 in FIG. 1 as an example. CSI may be measured on channel bandwidth between the terminal 200 and the base station 300 in a same manner. In addition, the terminal may simultaneously measure CSI on channel bandwidth of the base station 100 and channel bandwidth of the base station 300.

To enable the terminal 200 to perform CSI measurement, the base station 100 further sends a reference signal to the terminal. For example, in an LTE specification, a CSI reference signal, namely, a CSI-RS, is provided, and is used by a terminal to measure CSI.

When the terminal 200 needs to measure CSI on the channel bandwidth, the base station 100 determines which frequency-domain location in a subband of the channel bandwidth needs to be measured. Therefore, the base station 100 generates CSI configuration information. The CSI configuration information includes first frequency-domain indication information. The CSI configuration information is used to instruct the terminal to measure a reference signal in a frequency-domain location that is corresponding to the first frequency-domain indication information and that is in the channel bandwidth.

CSI configuration information used in the related technology is as follows: A serving base station may configure a plurality of CSI processes for a target user. In each CSI process, non-zero power (NZP) of the terminal is indicated, to measure channel information; and an interference measurement resource (IMR) is also indicated, to measure interference. In addition, reporting content and/or a reporting manner of a user that are corresponding to each CSI process are correspondingly specified in the configuration.

Specifically, the CSI configuration information may include CSI process information, including a CSI process identifier csi-Processld, a configuration identifier csi-RS-ConfigNZPId used to measure channel information, and a configuration identifier csi-IM-Configld used to measure interference information. Therefore, in this embodiment of this application, the first frequency-domain indication information is added to the existing CSI configuration information, so that the terminal 200 accurately measures the channel bandwidth.

The channel bandwidth needs to be divided, so that the terminal 200 measures CSI in the reference signal in the corresponding frequency-domain location based on the CSI configuration information sent by the base station 100. In this embodiment provided in this application, the channel bandwidth may be divided in two manners. In a first channel bandwidth division manner, the base station 100 and the terminal 200 perform division in a preset manner. In a second division manner, the base station 100 may define a channel bandwidth division manner, add the division manner to the CSI configuration information, and send the CSI configuration information to the terminal 200. The terminal 200 may perform channel bandwidth division based on the CSI configuration information sent by the base station 100.

In the first channel bandwidth division manner, the terminal 200 and the base station 100 may divide the channel bandwidth in the predetermined manner, and divide the channel bandwidth into a plurality of resource blocks.

It should be noted that, in this embodiment of this application, the channel bandwidth is divided into the plurality of resource blocks, and each resource block group may be one RB, two RBs, or a plurality of RBs. A resource included in each resource block should be less than the channel bandwidth. Some resources in resource blocks obtained after the division may overlap, or resources in resource blocks do not overlap. A resource block (RB) is a resource unit (resource granularity) in an existing LTE technology. In 5G or a subsequent protocol, a resource unit may not be defined based on an RB. The resource unit or the resource granularity may be specified in another manner. This is not limited herein. For example, if the channel bandwidth is 100 RBs, and the channel bandwidth is divided based on a granularity of two RBs, the channel bandwidth may be divided into 50 resource blocks groups, and each resource block group is two RBs.

The first channel bandwidth division manner is obtained through pre-negotiation between the terminal 200 and the base station 100, and the base station 100 may not determine a division rule with the terminal again.

In the second channel bandwidth division manner, the base station 100 may add the channel bandwidth division manner to the CSI configuration information, and the terminal 200 divides the channel bandwidth based on the CSI configuration information sent by the base station 100.

Specifically, the CSI configuration information sent by the base station 100 to the terminal includes the first frequency-domain indication information, and the terminal 200 divides the channel bandwidth based on channel division information in the first frequency-domain indication information.

After dividing the channel bandwidth into the plurality of resource blocks, the terminal 200 measures the reference signal based on the CSI configuration information sent by the base station 100. It should be noted that the reference signal may be a reference signal sent by the base station 100, the base station 300, another base station or transmission point, or the like.

In a process of measuring the reference signal, based on the CSI configuration information, the terminal 200 does not need to measure CSI on the entire channel bandwidth, and may perform measurement on the corresponding frequency-domain location in the first frequency-domain indication information.

When the terminal 200 measures CSI, there may be two manners of performing measurement on the channel bandwidth that is divided into the plurality of resource blocks.

In a first measurement manner, each of the plurality of resource blocks into which the channel bandwidth is divided is corresponding to one frequency-domain measurement identifier. The frequency-domain measurement identifier may be classified into a first measurement identifier and a second measurement identifier. The terminal 200 measures a resource block corresponding to the first measurement identifier, and does not measure a resource block corresponding to the second measurement identifier. For example, if the channel bandwidth is 100 RBs, and the channel bandwidth is divided based on a granularity of two RBs, the channel bandwidth is divided into 50 resource blocks groups, and each resource block group is two RBs. Then the CSI configuration information may include 50 bits, to separately identify the 50 resource blocks groups. For example, bit information of a measurement identifier is 1 or 0, and the terminal 200 measures a resource block whose measurement identifier is 1, and does not measure a reference signal on a resource block whose measurement identifier is 0. In this way, the terminal 200 performs corresponding measurement based on a measurement identifier of a to-be-measured resource block, and may accurately measure CSI on the channel bandwidth.

For example, bit mapping may be used in the first measurement manner. When the channel bandwidth is divided into the plurality of resource blocks groups in the manners of the foregoing embodiment, a granularity of each resource block group may be as follows:

(1) When channel bandwidth measurement is performed based on a granularity of one RB, a quantity, indicated by the first frequency-domain indication information, of bits for bit mapping is a quantity of RBs of the channel bandwidth, namely, $N_{RB}^{DL}$. $N_{RB}^{DL}$ indicates a quantity of RBs of the channel bandwidth.

(2) When channel bandwidth measurement is performed based on a granularity of two RBs, a quantity, indicated by the first frequency-domain indication information, of bits for bit mapping is half of a quantity of RBs of the channel bandwidth, namely, $N_{RB}^{DL}/2$.

(3) When channel bandwidth measurement is performed based on a granularity of PRBs, namely, an existing resource block group (RBG) size, a quantity, indicated by the first frequency-domain indication information, of bits for bit mapping is $N_{RB}^{DL}/P$. P is an integer greater than or equal to 2, as shown in Table 1.

TABLE 1

| Channel bandwidth (size) $N_{RB}^{DL}$ | RBG (size) (P) |
|---|---|
| ≤10 | 1 |
| 11-26 | 2 |
| 27-63 | 3 |
| 64-110 | 4 |

(4) When channel bandwidth measurement is performed based on a granularity of K, namely, an existing CSI measurement subband size, a quantity, indicated by the first frequency-domain indication information, of bits for bit mapping is $N_{RB}^{DL}/K$. K is a positive integer, as shown in Table 2.

TABLE 2

| Channel bandwidth (size) $N_{RB}^{DL}$ | Subband Size (K) |
|---|---|
| 6-7 | NA |
| 8-10 | 4 |
| 11-26 | 4 |
| 27-63 | 6 |
| 64-110 | 8 |

In a second measurement manner, the first frequency-domain indication information in the CSI configuration information may further include an information identifier of a to-be-measured resource block. The information identifier includes a frequency-domain location of the to-be-measured resource block. The terminal 200 may measure the resource block in the corresponding frequency-domain location based on an indication of the information identifier of the to-be-measured resource block.

For example, the resource block in the corresponding frequency-domain location may be measured in the following manners.

Manner 1:

All RBGs are divided into P subsets, where P is an RBG size. Each RBG subset p(0≤p<P) includes all RBGs that start from an RBG p and that has a spacing of P. RB resources allocated to a terminal need to come from a same subset.

A first field includes $\lceil \log_2(p) \rceil$ bits, and is used to specify a selected RBG subset, namely, a value of p.

A second field includes one bit (a shift bit), and is used to specify whether a resource in the subset is shifted. 1 indicates that the resource is shifted, and 0 indicates that the resource is not shifted.

A third field includes one bitmap. Each bit in the bitmap is corresponding to one RB (note that it is not an RBG) in the selected RBG subset. A highest-order bit indicates a first RB in the subset, a lowest-order bit indicates a last RB in the subset, and so on. If an RB is allocated to a terminal, a corresponding bit in the bitmap is set to 1; otherwise, a corresponding bit in the bitmap is set to 0. A bitmap size, namely, a quantity $N_{RB}^{TYPE1}$ of bits included in the bitmap is as follows:

$$N_{RB}^{TYPE1} = \lceil N_{RB}^{DL}/P \rceil - \lceil \log_2(P) \rceil - 1$$

A index of a start RB in a selected RBG subset start from a smallest RB index in the subset+a shift amount $\Delta_{shift}(p)$, and a start RB is corresponding to a highest-order bit in a bitmap. The shift amount is represented by a quantity of RBs, and indicates a shift that occurs in the selected RBG subset. If the second field is 0, the shift in the RBG subset p is $\Delta_{shift}(p)=0$. If the second field is 1, the shift in the RBG subset p is $\Delta_{shift}(p)=N_{RB}^{RBGsubnet}(p)-N_{RB}^{TYPE1}$, and the lowest-order bit in the bitmap is adjusted to the last RB in the corresponding RBG subset.

$N_{RB}^{RBG\ subset}(p)$ is a quantity of RBs included in the RBG subset p. A calculation formula is as follows:

$$N_{RB}^{RBG\ subset}(p) = \begin{cases} \left\lfloor \frac{N_{RB}^{DL}-1}{P^2} \right\rfloor \cdot P + P, & p < \left\lfloor \frac{N_{RB}^{DL}-1}{P} \right\rfloor \bmod P \\ \left\lfloor \frac{N_{RB}^{DL}-1}{P^2} \right\rfloor \cdot P + (N_{RB}^{DL}-1) \bmod P + 1, & p = \left\lfloor \frac{N_{RB}^{DL}-1}{P} \right\rfloor \bmod P \\ \left\lfloor \frac{N_{RB}^{DL}-1}{P^2} \right\rfloor \cdot P, & p > \left\lfloor \frac{N_{RB}^{DL}-1}{P} \right\rfloor \bmod P \end{cases}$$

An RB corresponding each bit i (i=0, 1, . . . , $N_{RB}^{TYPE1}-1$) in the bitmap of the RBG subset p may be calculated by using the following formula:

$$n_{VRB}^{RBG\ subset}(p) = \left\lfloor \frac{i+\Delta_{shift}(p)}{P} \right\rfloor P^2 + p \cdot P + (i+\Delta_{shift}(p)) \bmod P$$

The foregoing RB may be a virtual resource block (VRB), or may be a physical resource block (PRB). Therefore, frequency-domain indication information may indicate a location of a VRB, and then the VRB is mapped to a PRB; or frequency-domain indication information may directly indicate a location of a PRB. This is not limited herein.

Manner 2:

In frequency-domain indication information, a resource allocated to a terminal is a continuous segment of RBs. The RBs may be localized, or may be distributed.

First, one bit in a frequency-domain indication field is used to indicate whether localized RBs are used (e.g., when the bit is 0) or distributed RBs are used (e.g., when the bit is 1).

Centralized resource allocation is represented by a resource indication value RIV. A start RB allocated to the terminal and a length ($L_{CRBs}$) of continuously allocated RBs may be obtained through derivation by using the value. Calculation formulas are as follows:

If $(L_{CRBs}-1)\le\lfloor N_{RB}^{DL}/2\rfloor$, $RIV=N_{RB}^{DL}(L_{CRBs}-1)+RB_{start}$; otherwise, $RIV=N_{RB}^{DL}(N_{RB}^{DL}-L_{CRBs}+1)+(N_{RB}^{DL}-1-RB_{start})$, where $L_{CRBs}\ge1$ and is not greater than $N_{VRB}^{DL}-RB_{start}$.

Based on $\lfloor RVI/N_{RB}^{DL}\rfloor+RVI\ \%\ N_{RB}^{DL}$, it may be learned whether $(L_{CRBs}-1)\le\lfloor N_{RB}^{DL}/2\rfloor$ or $(L_{CRBs}-1)>\lfloor N_{RB}^{DL}/2\rfloor$, and $RB_{start}$ and $L_{CRBs}$ are finally obtained through calculation.

$L_{CRBs}\ge1$ and is not greater than $N_{VRB}^{DL}-RB_{start}$, and $N_{VRB}^{DL}\le N_{RB}^{DL}$ is definitely met. Therefore, $RB_{start}+L_{CRBs}\le N_{RB}^{DL}$; and 1. When $(L_{CRBs}-1)\le\lfloor N_{RB}^{DL}/2\rfloor$, $\lfloor RVI/N_{RB}^{DL}\rfloor+RVI\ \%\ N_{RB}^{DL}=RB_{start}+L_{CRBs}-1<N_{RB}^{DL}$; 2. When $(L_{CRBs}-1)>\lfloor N_{RB}^{DL}/2\rfloor$, $\lfloor RBI/N_{RB}^{DL}\rfloor+RVI\ \%\ N_{RB}^{DL}=2N_{RB}^{DL}-(RB_{start}+L_{CRBs})\ge N_{RB}^{DL}$.

After receiving the RIV, the terminal calculates a value x of $\lfloor RVI/N_{RB}^{DL}\rfloor+RVI\ \%\ N_{RB}^{DL}$.

(1) If $x<N_{RB}^{DL}$, it can be learned that $(L_{CRBs}-1)\le\lfloor N_{RB}^{DL}/2\rfloor$, and a final result is obtained: $RB_{start}=RIV\ \%\ N_{RB}^{DL}$, and $L_{CRBs}=\lfloor RVI/N_{RB}^{DL}\rfloor+1$. (2) If $x\ge N_{RB}^{DL}$, it can be learned that $(L_{CRBs}-1)>\lfloor N_{RB}^{DL}/2\rfloor$, and a final result is obtained: $RB_{start}=N_{RB}^{DL}-RIV\ \%\ N_{RB}^{DL}-1$, and $L_{CRBs}=N_{RB}^{DL}-\lfloor RVI/N_{RB}^{DL}\rfloor+1$. A resource allocated to a terminal in distributed resource allocation may be $N_{RB}^{step}$ RBs to a maximum of $\lfloor N_{VRB}^{DL}/N_{RB}^{step}\rfloor\cdot N_{RB}^{step}$ RBs, where $N_{RB}^{step}$ is an increase step, and is related to downlink channel bandwidth $N_{RB}^{DL}$, as shown in the following table:

TABLE 3

| channel BW ($N_{RB}^{DL}$) | $N_{RB}^{step}$ |
|---|---|
| 6-49 | 2 |
| 50-110 | 4 |

The distributed resource allocation is also represented by a resource indication value RIV. A start RB ($RB_{start}=0$, $N_{RB}^{step}$, $2N_{RB}^{step}$, . . . , $(\lfloor N_{VRB}^{DL}/N_{RB}^{step}\rfloor-1)N_{RB}^{step}$) allocated to the terminal and a length ($L_{CRBs}=N_{RB}^{step}$, $2N_{RB}^{step}$, . . . , $\lfloor N_{VRB}^{DL}/N_{RB}^{step}\rfloor\cdot N_{RB}^{step}$) of continuously allocated RBs may be obtained through derivation by using the value. Calculation formulas are as follows:

If $(L'_{CRBs}-1)\le\lfloor N'_{VRB}{}^{DL}/2\rfloor$, $RIV=N'_{VRB}{}^{DL}(L'_{CRBs}-1)+RB'_{start}$; otherwise, $RIV=N'_{VRB}{}^{DL}(N'_{VRB}{}^{DL}-L'_{CRBs}+1)+(N'_{VRB}{}^{DL}-1-RB'_{start})$, where $L'_{CRBs}=L_{CRBs}/N_{RB}^{step}$, $RB'_{start}=RB_{start}/N_{RB}^{step}$, $N'_{VRB}{}^{DL}=\lfloor N_{VRB}^{DL}/N_{RB}^{step}\rfloor$, and $L'_{CRBs}\ge1$ is not greater than $N'_{VRB}{}^{DL}-RB'_{start}$.

A manner of calculating $RB_{start}$ and $L_{CRBs}$ by the terminal after receiving the RIV is similar to the foregoing manner, and is not described herein.

The foregoing RB may be a virtual resource block (VRB), or may be a physical resource block (PRB). Therefore, frequency-domain indication information may indicate a location of a VRB, and then the VRB is mapped to a PRB; or frequency-domain indication information may directly indicate a location of a PRB. This is not limited herein.

Specifically, an information identifier of a to-be-measured information block in the frequency-domain indication information may be indicated by using a resource indication method in an existing protocol, or may be indicated by using another indication method. This is not limited herein. The terminal in this embodiment may be described by using the terminal 200 in FIG. 1 as an example.

In addition, the terminal 200 obtains, by using RRC or physical layer signaling, the CSI configuration information sent by the base station 100.

Specifically, the frequency-domain indication information may be configured for a CSI measurement resource, or may be configured for channel quality indicator (CQI) reporting. If the frequency-domain indication information is configured for the CSI measurement resource, it indicates that a resource occupied by the reference signal is only in a frequency-domain location indicated by the frequency-domain indication information, and UE needs to measure only the reference signal in the frequency-domain location. If the frequency-domain indication information is configured for the CQI reporting, it indicates that a CQI reported by UE is CSI obtained based on a reference signal in a frequency-domain location indicated by the frequency-domain indication information.

Specifically, configuration may be performed based on the following signaling fields.

Configure the frequency-domain indication information for an interference measurement (CSI-IM) resource in a CSI process:

The base station configures the frequency-domain indication information for the interference measurement (CSI-IM) resource in the CSI process, and notifies the UE that interference measurement for the resource is applicable only to the indicated frequency-domain location. After the UE receives the frequency-domain indication information, the UE considers impact only on the frequency-domain location of the resource during the interference measurement for the resource.

During reporting, for frequency-domain indication information configured for different interference measurement resources, CSI information for a frequency-domain location may be reported, or average CSI information for entire measurement bandwidth may be reported.

Specifically, the frequency-domain indication information is indicated by a frequencyConfig field as follows:

```
CSI-IM-Config-r11 ::=           SEQUENCE {
    csi-IM-ConfigId-r11             CSI-IM-ConfigId-r11,
    resourceConfig-r11              INTEGER (0..31),
    frequencyConfig             BIT STRING OR OTHER
    subframeConfig-r11              INTEGER (0..154),
    ...
}
and/or
CSI-IM-ConfigExt-r12 ::=            SEQUENCE {
    csi-IM-ConfigId-v1250       CSI-IM-ConfigId-v1250, resourceConfig-r12
INTEGER (0..31),
    frequencyConfig             BIT STRING OR OTHER
    subframeConfig-r12              INTEGER (0..154),
    ...
}
-- ASN1STOP
```

Configure the frequency-domain indication information for a CSI-RS resource in CSI-RS-configNZPId:

The base station configures the frequency-domain indication information for the CSI-RS resource in CSI-RS-configNZPId, to instruct the UE to measure the resource and indicate that the measurement is applicable only to the frequency-domain location indicated by the frequency-domain indication information.

A specific RRC signaling notification (e.g., frequencyConfig is added) is as follows:

```
CSI-RS-ConfigNZP information elements
-- ASN1START
CSI-RS-ConfigNZP-r11 ::=                SEQUENCE {
    csi-RS-ConfigNZPId-r11                  CSI-RS-ConfigNZPId-r11,
    antennaPortsCount-r11                   ENUMERATED {an1, an2, an4, an8},
    resourceConfig-r11                      INTEGER (0..31),
    frequencyConfig                     BIT STRING OR OTHER
    subframeConfig-r11                      INTEGER (0..154),
    scramblingIdentity-r11                  INTEGER (0..503),
    qcl-CRS-Info-r11                        SEQUENCE {
        qcl-ScramblingIdentity-r11              INTEGER (0..503),
        crs-PortsCount-r11                      ENUMERATED {n1, n2, n4, spare1},
        mbsfn-SubframeConfigList-r11            CHOICE {
                release                             NULL,
                setup                               SEQUENCE {
                    subframeConfigList                  MBSFN-SubframeConfigList
                }
        }
OPTIONAL -- Need ON
    }
OPTIONAL,-- Need OR
    ...,
    [[  eMIMO-Info-r13                          CHOICE {
            release                             NULL,
            setup                               SEQUENCE {
                nzp-resourceConfigList-r13              SEQUENCE (SIZE (2..8)) OF
ResourceConfig-r13,
                cdmType                                     ENUMERATED {cdm2,
cdm4} OPTIONAL -- Need OR
            }
        }
OPTIONAL -- Need ON
    ]]
}
and/or
ResourceConfig-r13 ::=                          INTEGER (0..31)
frequencyConfig                             BIT STRING OR OTHER
-- ASN1STOP
```

Configure the frequency-domain indication information for the CQI reporting:

The base station configures the frequency-domain indication information for the CQI reporting, to indicate to the UE that the reported CQI is the CSI obtained by measuring the reference signal in the frequency-domain location indicated by the frequency-domain indication information.

A specific RRC signaling notification (e.g., frequencyConfig is added) is as follows:

```
    CQI-ReportConfig information elements
    -- ASN1START
    CQI-ReportConfig ::=              SEQUENCE {
        cqi-ReportModeAperiodic           CQI-ReportModeAperiodic
OPTIONAL,  -- Need OR
        nomPDSCH-RS-EPRE-Offset           INTEGER (−1..6),
        cqi-ReportPeriodic            CQI-ReportPeriodic OPTIONAL
-- Need ON
        frequencyConfig                 BIT STRING OR OTHER
    }
    or,
    CQI-ReportConfig-v920 ::=         SEQUENCE {
        cqi-Mask-r9                   ENUMERATED {setup}   OPTIONAL,
-- Cond cqi-Setup
        pmi-RI-Report-r9              ENUMERATED {setup}   OPTIONAL
-- Cond PMIRI
        frequencyConfig                 BIT STRING OR OTHER
    }
```

The terminal 200 measures a reference signal in a frequency-domain location corresponding to the first frequency-domain indication information, to obtain CSI. The CSI may include measurement results that are respectively corresponding to measured resource blocks in the channel bandwidth; or measurement results that are respectively corresponding to measured resource blocks may be processed in a preset manner, and a processing result is used as the CSI. The preset manner may be: determining the CSI in a manner of calculating an average value or a maximum value of the measurement results obtained by measuring the resource blocks. The terminal 200 may report the CSI to the base station 100 in a form of a measurement report.

In the related technology, a terminal usually performs rate matching based on full bandwidth, and cannot perform rate matching on a signal in a specific frequency-domain location in channel bandwidth. As a result, a rate matching result obtained by the terminal in the related technology may be inaccurate, and resources are wasted. Therefore, according to a requirement, to perform rate matching on corresponding data in a specific frequency-domain location in channel bandwidth, another embodiment provided in this application further provides a rate matching method, to perform rate matching. FIG. 1 is still used as an example for description. A rate matching process in this embodiment of this application may be applied to communication processes between terminals, between a terminal and a base station, between base stations, and the like. This embodiment of this application is not limited thereto. For ease of understanding, this application is described by using communication between a terminal and a base station as an example.

With reference to FIG. 1, the base station 100 sends rate configuration information to the terminal. The rate configuration information includes second frequency-domain indication information. The rate configuration information is used to instruct the terminal 200 to perform rate matching. The second frequency-domain indication information is used to instruct the terminal 200 to perform rate matching on received data in a resource location of a reference signal in the frequency-domain location corresponding to the second frequency-domain indication information.

The second frequency-domain indication information herein may be different from the first frequency-domain indication information in the foregoing embodiment. The first frequency-domain indication information in the foregoing embodiment is mainly used to indicate the frequency-domain location in which the terminal 200 performs CSI measurement. The second frequency-domain indication information herein mainly indicates a frequency-domain location in which the terminal 200 performs rate matching.

The terminal 200 receives the rate configuration information sent by the base station 100, and performs, based on the rate configuration information, rate matching on the received data in the resource location of the reference signal in the frequency-domain location corresponding to the second frequency-domain indication information. A reference signal may be sent by the base station 100, or may be sent by another base station or transmission point, or the like.

In a process of performing rate matching based on the rate configuration information, the terminal 200 further needs to divide channel bandwidth into a plurality of resource blocks. Specifically, the channel division manner in the foregoing embodiment may be used as the manner of dividing the channel bandwidth into resource blocks. Details are not described herein again.

In this rate matching solution, a specific indication method of the frequency-domain indication information is as follows:

The base station 100 configures the frequency-domain indication information in csi-RS-ConfigZPId-r11 of a PDSCH-RE-MappingQCL-Config field. To be specific, the base station 100 configures the frequency-domain indication information for a ZP CSI-RS resource, to indicate that the UE may consider only a frequency band in which the ZP CSI-RS resource is located when the UE performs rate matching for the ZP CSI-RS resource.

After the UE receives the frequency-domain indication information, the UE may consider only the frequency band in which the ZP CSI-RS resource is located when the UE performs rate matching on data based on a location of the ZP CSI-RS resource, and does not need to perform rate matching based on full bandwidth.

Specific RRC signaling (such as frequencyConfigList) is as follows:

```
        PDSCH-RE-MappingQCL-Config-r11 ::=                SEQUENCE {
                        pdsch-RE-MappingQCL-ConfigId-r11
    PDSCH-RE-MappingQCL-ConfigId-r11,
                        optionalSetOfFields-r11
SEQUENCE {
                                                crs-PortsCount-r11
ENUMERATED {n1, n2, n4, spare1},
            crs-FreqShift-r11                       INTEGER (0..5),
            mbsfn-SubframeConfigList-r11                CHOICE {
                    release
NULL,
                    setup                                  SEQUENCE {
                                subframeConfigList
MBSFN-SubframeConfigList
                }
            }               OPTIONAL,-- Need ON
            pdsch-Start-r11             ENUMERATED {reserved, n1, n2, n3, n4, assigned}
                            }                 OPTIONAL,-- Need OP
                        csi-RS-ConfigZPId-r11           CSI-RS-ConfigZPId-r11,
                        qcl-CSI-RS-ConfigNZPId-r11
    CSI-RS-ConfigNZPId-r11              OPTIONAL,-- Need OR
            ...
        }
        CSI-RS-ConfigZP information elements
        -- ASN1START
        CSI-RS-ConfigZP-r11 ::=                     SEQUENCE {
            csi-RS-ConfigZPId-r11                   CSI-RS-ConfigZPId-r11,
            resourceConfigList-r11                  BIT STRING (SIZE (16)),
            frequencyConfigList-r14                  SEQUENCE{non zero number of
resourceConfigList-r11} OF BIT STRING(SIZE (N)) OPTIONAL, -- Need OR
            subframeConfig-r11                      INTEGER (0..154),
            ...
        }
        -- ASN1STOP
```

In the rate matching, puncturing may be performed after the data is mapped to the resource, or the data is not mapped to the resource. The rate matching includes but is not limited to the foregoing cases.

A physical layer signaling notification method is as follows:

Frequency-domain indication information for CSI measurement and/or frequency-domain indication information for rate matching are/is added to DCI (downlink control information).

An example of the frequency-domain indication information for CSI measurement is as follows:

CSI frequency information field—4 or 5 bits

If there are a plurality of CSI process configurations, CSI-process IDs need to be indicated.

If there are a plurality of CSI-IM configurations, CSI-IM IDs need to be indicated.

If there are a plurality of NZP CSI-RS configurations, NZP CSI-RS IDs need to be indicated.

The field is used to indicate frequency-domain location information of a reference signal for CSI measurement, or is used to indicate frequency-domain location information for CSI reporting. In addition, the base station may configure frequency-domain indication information for different measurement resource identifiers. A measurement resource identifier may be a CSI-process ID, a CSI-IM ID, an NZP CSI-RS ID, or an identifier of another measurement resource. This is not limited herein.

Frequency-domain indication is usually performed by using a relatively large granularity, such as a granularity of a subband, so as to reduce signaling overheads.

An example of the frequency-domain indication information for rate matching is as follows:

rate matching frequency information field—2 or 3 bits

The field is used to indicate frequency-domain location information of a reference signal for rate matching.

The reference signal for rate matching may be a ZP CSI-RS, or another reference signal used to instruct the UE to perform rate matching. This is not limited herein.

An example in which the reference signal for rate matching is a ZP CSI-RS is used in the following. The base station 100 may preconfigure a plurality of ZP CSI-RS IDs. When a ZP CSI-RS used to send data to the UE is different from that in previously configured RRC signaling, the base station may notify the UE of only a ZP CSI-RS ID by using physical layer signaling. In other words, the base station may configure frequency-domain indication information for different ZP CSI-RS IDs.

It should be noted that the configuration method in this embodiment of this application includes but is not limited to the foregoing solution.

The second frequency-domain indication information in the rate configuration information includes: each of the plurality of resource blocks of the channel bandwidth is corresponding to one rate matching identifier. The rate matching identifier may be classified into a first rate matching identifier and a second rate matching identifier. The terminal 200 obtains the rate matching identifier corresponding to each of the plurality of resource blocks of the channel bandwidth, to determine a resource location of a reference signal on a resource block whose rate matching identifier in the channel bandwidth is the first rate matching identifier. Herein, the bit mapping manner in the foregoing embodiment may be used to establish a correspondence between each resource block and one rate matching identifier, so that the terminal 200 performs rate matching on data on the corresponding resource block based on the rate matching identifier.

In addition, the second frequency-domain indication information may include an information identifier of a resource block on which rate matching is to be performed. The information identifier includes a frequency-domain location. When performing rate matching, the terminal 200 determines a resource location of a reference signal on a resource block corresponding to the frequency-domain location, and performs rate matching on data based on the resource location.

Figure 2:
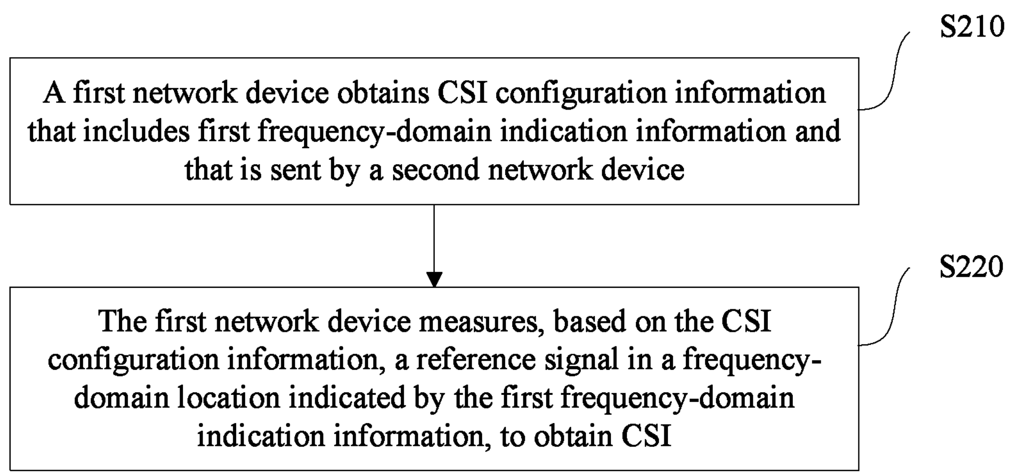
FIG. 2 is a flowchart of a CSI measurement method according to an example embodiment.

To describe in detail processes of performing the foregoing embodiments on a terminal side and a base station side, in another embodiment provided in this application, as shown in FIG. 2, a CSI measurement method is further provided. The method is applied to a first network device, and the method may include the following steps.

In step S210, the first network device obtains CSI configuration information that includes first frequency-domain indication information and that is sent by a second network device.

The first network device may be a device such as a terminal or a base station. The second network device may also be a device such as a terminal or a base station. For example, the method may be applied to communication between terminals, between a terminal and a base station, or between base stations.

The CSI configuration information in this embodiment of this application may include first frequency-domain indication information. The CSI configuration information is used to instruct the first network device to perform CSI measurement. The first frequency-domain indication information is used to indicate a frequency-domain location in which the first network device performs CSI measurement.

In addition, the first network device may obtain, by using RRC or physical layer signaling, the CSI configuration information that includes the first frequency-domain indication information and that is sent by the second network device.

In step S220, the first network device measures, based on the CSI configuration information, a reference signal in the frequency-domain location indicated by the first frequency-domain indication information, to obtain CSI.

The reference signal in this embodiment of this application may include a channel measurement reference signal and/or an interference measurement reference signal.

The first frequency-domain indication information includes channel division information. The channel division information is used to indicate a manner of dividing channel bandwidth into a plurality of resource blocks. This channel bandwidth division manner is equivalent to the first channel bandwidth division manner in the foregoing embodiments. Details are not described herein again. For details, refer to the foregoing embodiments.

The first network device may divide the channel bandwidth into the plurality of resource blocks in a preset division manner. This channel bandwidth division manner is equivalent to the second channel bandwidth division manner in the foregoing embodiments. Details are not described herein again. For details, refer to the foregoing embodiments.

The first network device obtains a measurement result corresponding to a target resource block in the plurality of resource blocks, and uses the measurement result as the CSI.

Alternatively, the first network device obtains a measurement result corresponding to a target resource block in the plurality of resource blocks, and processes, in a preset manner, the measurement result corresponding to the target resource block, to obtain the CSI.

In this embodiment of this application, after obtaining the CSI, the first network device sends the CSI to the second network device.

Figure 3:
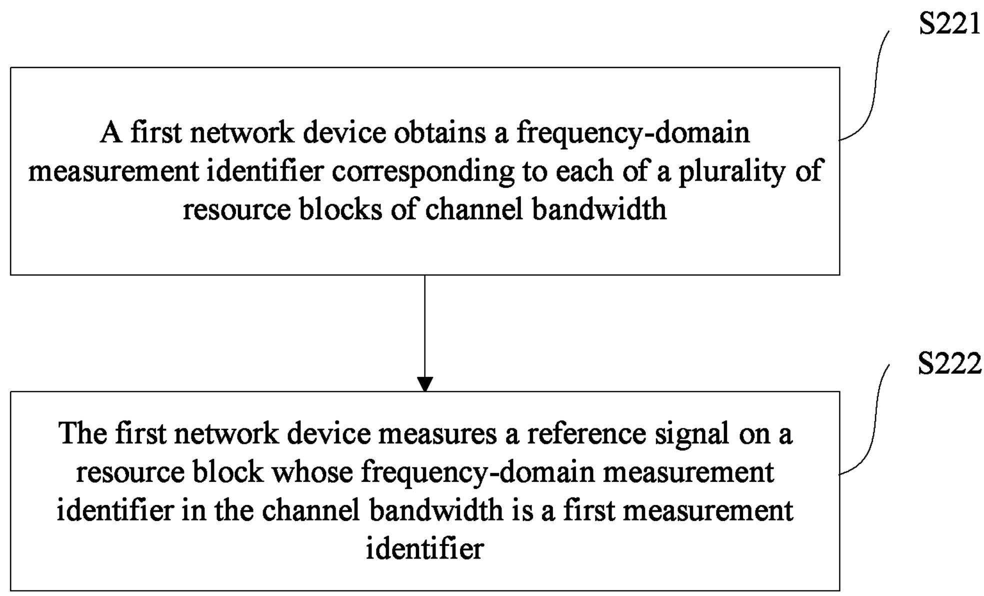
FIG. 3 is a flowchart of step S220 in FIG. 2.

To describe in detail how the first network device measures CSI on the channel bandwidth, as a refinement of the method in FIG. 2, in another embodiment provided in this application, the first frequency-domain indication information includes a frequency-domain measurement identifier corresponding to each of the plurality of resource blocks of the channel bandwidth. As shown in FIG. 3, step S220 may further include the following steps.

In step S221, the first network device obtains the frequency-domain measurement identifier corresponding to each of the plurality of resource blocks of the channel bandwidth.

The frequency-domain measurement identifier includes a first measurement identifier and a second measurement identifier.

This manner in this embodiment of this application is equivalent to the bit mapping manner used in the foregoing embodiments. For details, refer to the foregoing embodiments.

In step S222, the first network device measures a reference signal on a resource block whose frequency-domain measurement identifier in the channel bandwidth is the first measurement identifier.

After the channel bandwidth is divided into the plurality of resource blocks, a frequency-domain measurement identifier of a resource block that needs to be measured is correspondingly set to the first measurement identifier, and a frequency-domain measurement identifier of a resource block that does not need to be measured is correspondingly set to the second measurement identifier, so that the first network device measures a resource block whose frequency-domain measurement identifier in the channel bandwidth is the first measurement identifier.

Figure 4:
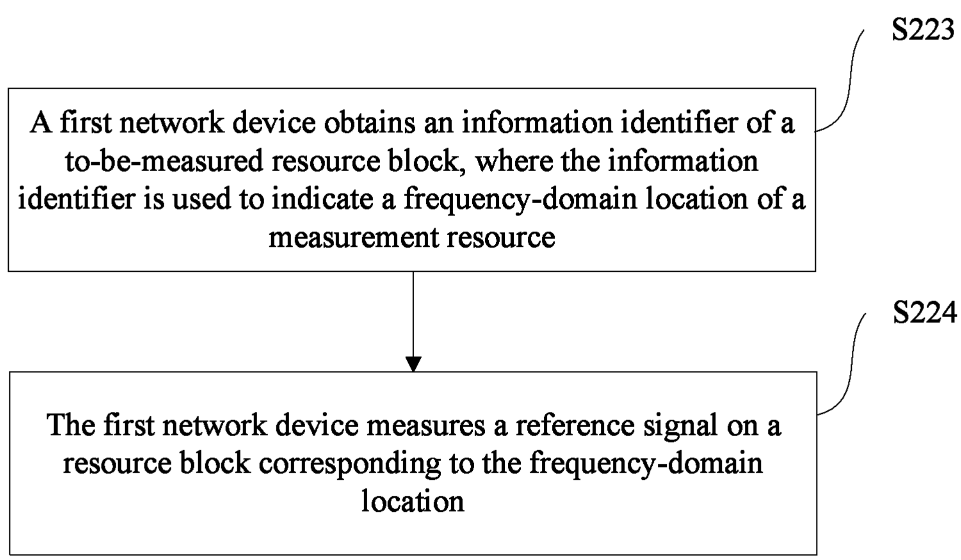
FIG. 4 is another flowchart of step S220 in FIG. 2.

To describe in detail how the first network device measures CSI on the channel bandwidth, as a refinement of the method in FIG. 2, in another embodiment provided in this application, the first frequency-domain indication information includes an information identifier of a to-be-measured resource block. As shown in FIG. 4, step S220 may further include the following steps.

In step S223, the first network device obtains the information identifier of the to-be-measured resource block, where the information identifier is used to indicate a frequency-domain location of a measurement resource.

In step S224, the first network device measures a reference signal on a resource block corresponding to the frequency-domain location.

This embodiment of this application is equivalent to obtaining an information identifier of a resource block that needs to be measured and that is the plurality of resource blocks of the channel bandwidth. The information identifier may be corresponding to a frequency-domain location of the resource block that needs to be measured, so that the first network device performs measurement.

In addition, the first network device sends the obtained CSI to the second network device. The obtained CSI includes:

CSI that is corresponding to a target resource block in the plurality of resource blocks and that is obtained by the first network device; or CSI that is obtained by the first network device by obtaining CSI corresponding to a target resource block in the plurality of resource blocks, and processing, in a preset manner, the CSI corresponding to the target resource block.

Figure 5:
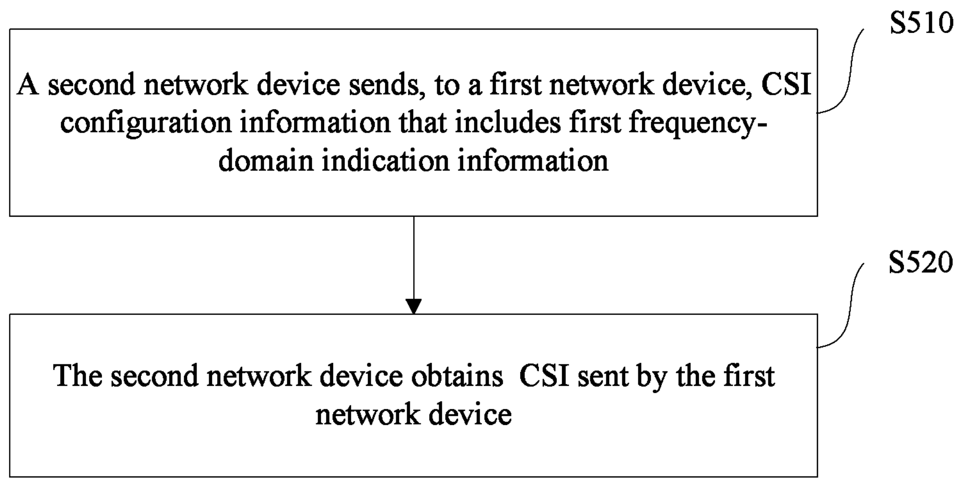
FIG. 5 is a flowchart of a CSI measurement method according to an example embodiment.

To describe in detail processes of performing the foregoing embodiments on a terminal side and a base station side, in another embodiment provided in this application, as shown in FIG. 5, a CSI measurement method is further provided. The method is applied to a second network device, and the method may include the following steps.

In step S510, the second network device sends, to a first network device, CSI configuration information that includes first frequency-domain indication information, where the CSI configuration information is used to instruct the first network device to perform CSI measurement, and the first frequency-domain indication information is used to indicate a frequency-domain location in which the first network device performs CSI measurement, so that the first network device measures, based on the CSI configuration information, a reference signal in the frequency-domain location indicated by the first frequency-domain indication information.

The first frequency-domain indication information includes channel division information. The channel division information is used to indicate a manner of dividing channel bandwidth into a plurality of resource blocks.

The second network device divides, in a preset division manner, channel bandwidth between the second network device and the first network device into a plurality of resource blocks.

Two channel bandwidth division manners herein are equivalent to the first channel bandwidth division manner and the second channel bandwidth division manner in the foregoing embodiments. For detailed implementations, refer to the foregoing embodiments.

The first frequency-domain indication information includes a frequency-domain measurement identifier corresponding to each of the plurality of resource blocks of the channel bandwidth, so that the first network device measures the resource block of the channel bandwidth based on the frequency-domain measurement identifier. Alternatively, the first frequency-domain indication information includes an information identifier of a to-be-measured resource block, so that the first network device measures a corresponding resource block of the channel bandwidth based on the information identifier.

In addition, the second network device may send, to the first network device by using RRC or physical layer signaling, the CSI configuration information that includes the first frequency-domain indication information. The reference signal may include a channel measurement reference signal and/or an interference measurement reference signal.

In step S520, the second network device obtains CSI sent by the first network device.

The CSI may be a measurement result that is corresponding to a target resource block in the plurality of resource blocks and that is obtained by the first network device; or a result that is obtained by the first network device by obtaining a measurement result corresponding to a target resource block in the plurality of resource blocks, and processing, in a preset manner, the measurement result corresponding to the target resource block.

In addition, the frequency-domain measurement identifier includes a first measurement identifier and a second measurement identifier.

The first measurement identifier is used to instruct the first network device to measure a reference signal on a resource block whose frequency-domain measurement identifier in the channel bandwidth is the first measurement identifier.

The second measurement identifier is used to instruct the first network device not to measure a reference signal on a resource block whose frequency-domain measurement identifier in the channel bandwidth is the second measurement identifier.

Figure 6:
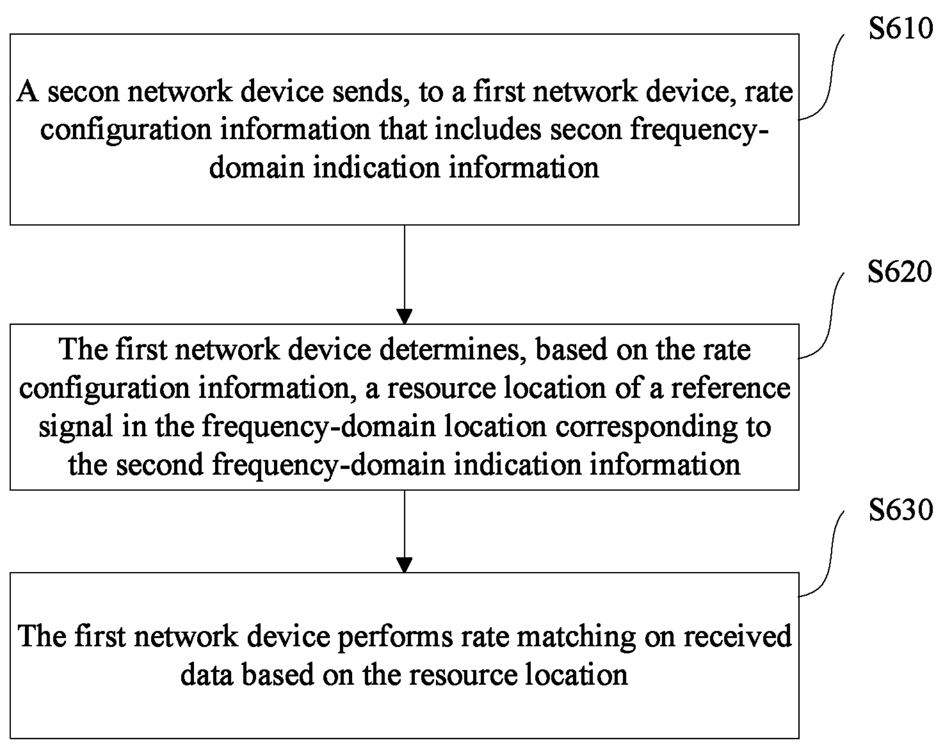
FIG. 6 is a flowchart of a rate matching method according to an example embodiment.

In another embodiment provided in this application, as shown in FIG. 6, a rate matching method is further provided. The method is applied to a first network device, and the method may include the following steps.

In step S610, a second network device sends, to the first network device, rate configuration information that includes second frequency-domain indication information.

The rate configuration information is used to instruct the first network device to perform rate matching, and the second frequency-domain indication information is used to indicate a frequency-domain location in which the first network device performs rate matching, so that the first network device determines, based on the rate configuration information, a resource location of a reference signal in the frequency-domain location corresponding to the second frequency-domain indication information, and performs rate matching on received data based on the resource location.

The second frequency-domain indication information includes channel division information. The channel division information is used to indicate a manner of dividing channel bandwidth into a plurality of resource blocks.

The first network device divides the channel bandwidth into the plurality of resource blocks in a preset division manner. Alternatively, the first network device obtains, by using radio resource control (RRC) or physical layer signaling, the rate configuration information that includes the second frequency-domain indication information and that is sent by the second network device. This is equivalent to the first channel bandwidth division manner and the second channel bandwidth division manner in the foregoing embodiments.

In step S620, the first network device determines, based on the rate configuration information, a resource location of a reference signal in the frequency-domain location corresponding to the second frequency-domain indication information.

In step S630, the first network device performs rate matching on received data based on the resource location.

In this embodiment provided in this application, the first network device may divide the channel bandwidth into the plurality of resource blocks, and then perform rate matching on data on a to-be-measured resource block.

Figure 7:
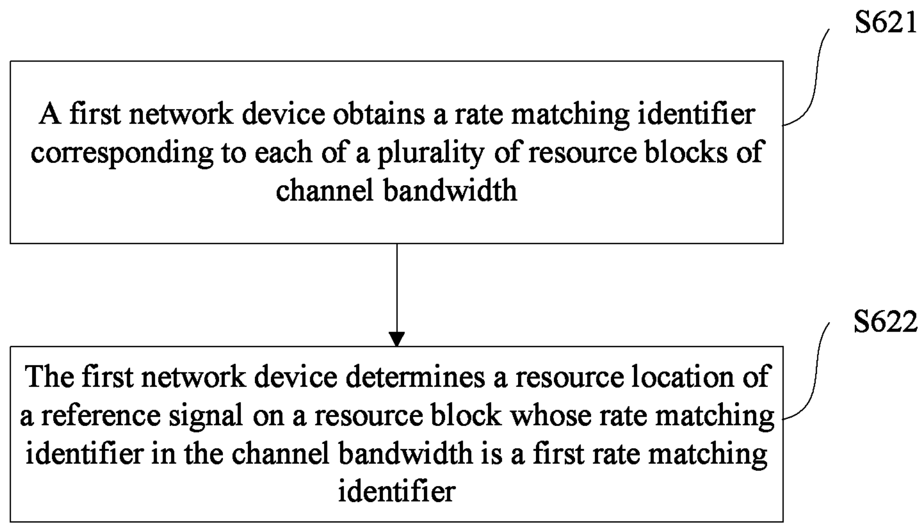
FIG. 7 is a flowchart of step S620 in FIG. 6.

As a refinement of the method in FIG. 6, in another embodiment provided in this application, as shown in FIG. 7, the second frequency-domain indication information includes: each of the plurality of resource blocks of the channel bandwidth is corresponding to one rate matching identifier. Step S620 may further include the following steps.

In step S621, the first network device obtains the rate matching identifier corresponding to each of the plurality of resource blocks of the channel bandwidth.

In step S622, the first network device determines a resource location of a reference signal on a resource block whose rate matching identifier in the channel bandwidth is the first rate matching identifier.

The rate matching identifier includes a first rate matching identifier and a second rate matching identifier.

Rate matching identifiers may be set for the plurality of resource blocks of the channel bandwidth. For example, a rate matching identifier of a resource block on which rate matching is to be performed is set to the first rate matching identifier, and a rate matching identifier of a resource block on which rate matching does not need to be performed is set to the second rate matching identifier.

Figure 8:
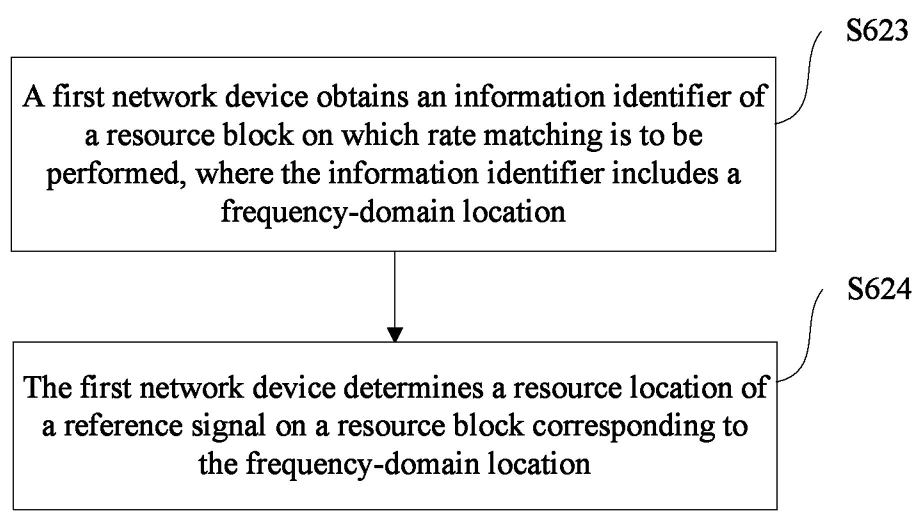
FIG. 8 is another flowchart of step S620 in FIG. 6.

As a refinement of the method in FIG. 6, in another embodiment provided in this application, as shown in FIG. 8, the second frequency-domain indication information includes an information identifier of a resource block on which rate matching is to be performed. Step S620 may further include the following steps.

In step S623, the first network device obtains the information identifier of the resource block on which rate matching is to be performed, where the information identifier includes a frequency-domain location.

In step S624, the first network device determines a resource location of a reference signal on a resource block corresponding to the frequency-domain location.

In this embodiment of this application, the information identifier of the resource block on which rate matching is to be performed is obtained, to determine the resource location on the resource block corresponding to the frequency-domain location in the information identifier, so that the first network device performs rate matching on data in the resource location.

Figure 9:
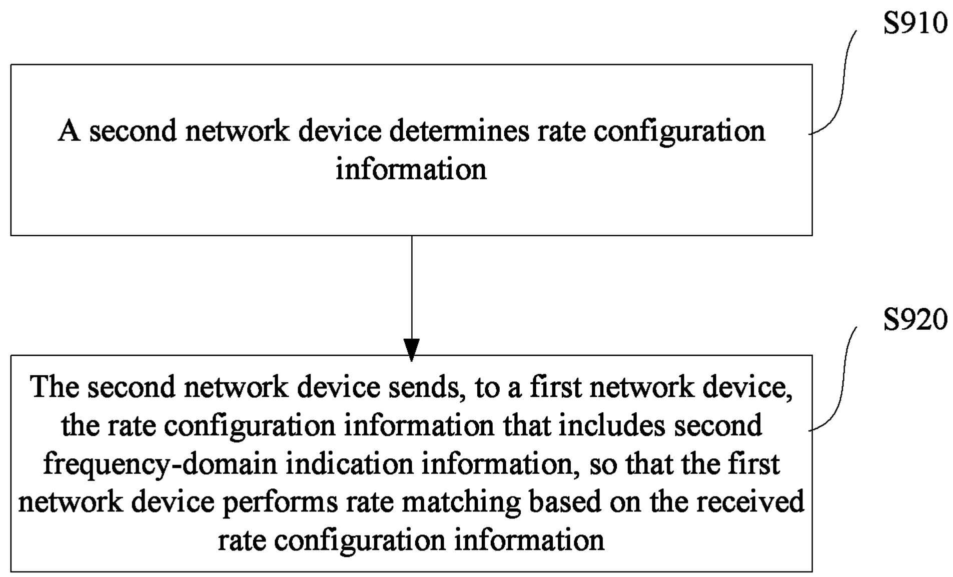
FIG. 9 is a flowchart of a rate matching method according to an example embodiment.

In another embodiment provided in this application, as shown in FIG. 9, a rate matching method is further provided. The method is applied to a second network device, and the method may include the following steps.

In step S910, the second network device determines rate configuration information.

The rate configuration information includes second frequency-domain indication information. The rate configuration information is used to instruct a first network device to perform rate matching. The second frequency-domain indication information is used to indicate a frequency-domain location in which the first network device performs rate matching.

The second frequency-domain indication information may include channel division information. The channel division information is used to divide channel bandwidth into a plurality of resource blocks.

Each of the plurality of resource blocks of the channel bandwidth is corresponding to one rate matching identifier, so that the first network device performs rate matching on data on the resource block of the channel bandwidth based on the rate matching identifier.

In addition, the second frequency-domain indication information may include an information identifier of a resource block on which rate matching is to be performed, so that the first network device performs rate matching on data on the corresponding resource block of the channel bandwidth based on the information identifier.

In step S920, the second network device sends, to the first network device, the rate configuration information that includes the second frequency-domain indication information, so that the first network device performs rate matching based on the received rate configuration information.

Specifically, the second network device may send, to the first network device by using RRC or physical layer signaling, the rate configuration information that includes the second frequency-domain indication information.

In addition, the rate matching identifier includes a first rate matching identifier and a second measurement identifier. The first measurement identifier is used to instruct the first network device to perform rate matching on data on a resource block whose rate matching identifier in the channel bandwidth is the first measurement identifier. The second measurement identifier is used to instruct the first network device not to perform rate matching on data on a resource block whose rate matching identifier in the channel bandwidth is the second measurement identifier.

The information identifier includes a frequency-domain location. The information identifier is used to instruct the first network device to determine a resource location of a reference signal on a resource block corresponding to the frequency-domain location, and instruct the first network device to perform rate matching on received data based on the resource location.

In the another embodiment provided in this application, because of multipath fading, a Doppler feature, and the like of a channel, channel matrices for different frequency-domain locations (or subbands) are different. When a base station performs coordinated incoherent JT, channels for different frequency-domain locations (or subbands) are different. Therefore, when a precoding matrix is selected for transmission, precoding matrices for different frequency-domain locations are also different, and inter-flow (or inter-layer, or inter-codeword) interference in different frequency-domain locations (or subbands) is different.

In the related technology, in interference measurement, an interference result is obtained by averaging interference on full bandwidth. In this case, the interference measurement is inaccurate.

In coordinated transmission, to enable a terminal to obtain accurate channel state information under inter-flow (or inter-layer, or inter-codeword) interference in CSI measurement, frequency-domain-restricted interference measurement or subband interference measurement needs to be considered.

An interference measurement method provided in the embodiments of this application may include the following specific implementations.

Figure 10:
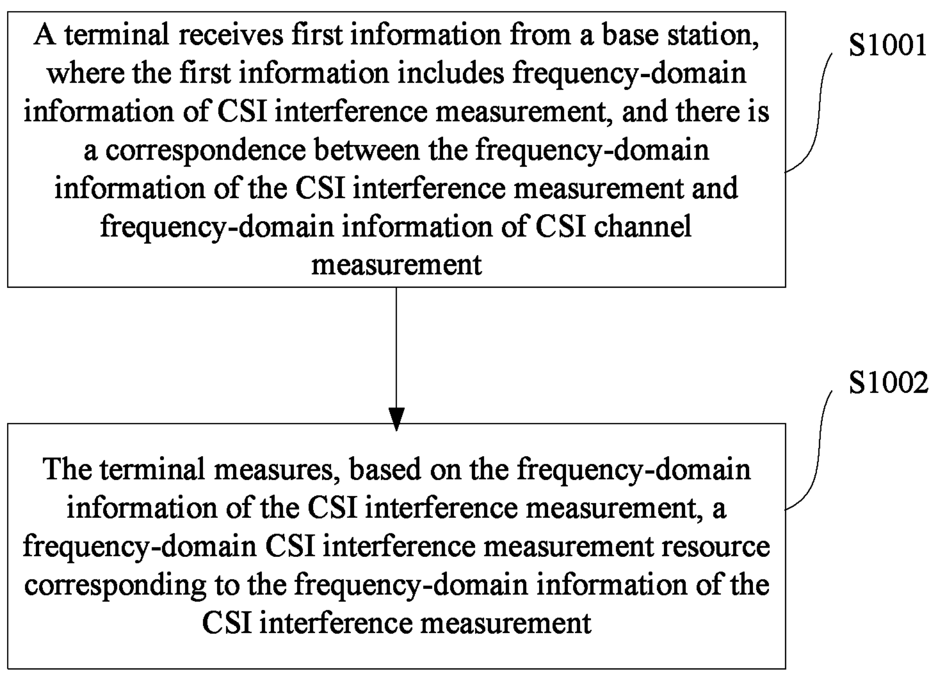
FIG. 10 is a flowchart of an interference measurement method according to an example embodiment.

Manner 1: As shown in FIG. 10, in an embodiment provided in this application, an interference measurement method provided in this embodiment of this application may include the following steps.

Step S1001: A terminal receives first information from a base station, where the first information includes frequency-domain information of CSI interference measurement, and there is a correspondence between the frequency-domain information of the CSI interference measurement and frequency-domain information of CSI channel measurement.

The frequency-domain information of the channel measurement may be frequency-domain information of information related to the channel measurement. For example, the information related to the channel measurement may be at least one of the following channel measurement information: a rank indication (RI), a precoding matrix indicator (PMI), a CQI, and a CSI-RS resource indicator (CRI).

The frequency-domain information of the interference measurement may be frequency-domain information of information related to the interference measurement. For example, the information related to the interference measurement may be at least one of the following interference measurement information: a rank indication (RI), a precoding matrix indicator (PMI), a CQI, and a CSI-RS Resource Indicator (CRI).

The first information may be CSI configuration information. For example, in an LTE system, the CSI configuration information may include at least one of CSI reporting configuration information and reference signal configuration information. In NR (a 5G system), the CSI configuration information may include at least one of reference signal setting (RS setting) configuration information, CSI reporting setting configuration information, and CSI measurement setting configuration information.

On this basis, for example, the frequency-domain information of the CSI interference measurement may be carried in at least one of the foregoing information or any information having a similar function.

Specific representation forms of the frequency-domain information of the CSI interference measurement may be as follows: a CSI interference reporting mode in the CSI reporting configuration information or the CSI reporting setting configuration information, where the CSI interference reporting mode indicates the frequency-domain information of the CSI interference measurement; frequency-domain information, in the reference signal configuration information, of a CSI interference measurement reference signal; frequency-domain information, in the reference signal setting configuration information, of a CSI interference measurement reference signal; and frequency-domain information in the CSI measurement setting configuration information.

The CSI interference reporting mode is used as an example. For example, the CSI interference reporting mode that may be configured by the base station includes: a subband CSI interference reporting mode, a partial-band CSI interference reporting mode, a wideband CSI interference reporting mode, or the like. The base station sends the configured CSI interference reporting mode to the terminal. After receiving the CSI interference reporting mode, the terminal may determine the frequency-domain information of the CSI interference measurement based on the CSI interference reporting mode, and further perform CSI interference measurement.

Specifically, because the CSI interference reporting mode indicates the frequency-domain information of the CSI interference measurement, the terminal may determine the frequency-domain information of the CSI interference measurement based on the CSI interference reporting mode.

For another example, the frequency-domain information of the interference measurement may alternatively be indicated by the frequency-domain information of the CSI interference measurement reference signal.

For details about how to perform indication, refer to the indication method in the foregoing embodiment.

Further, CSI interference reporting modes may include periodic, aperiodic, and semi-persistent CSI interference reporting modes, and the like. For example, for a periodic CSI interference reporting mode (Table 3 is used as an example), the base station may configure an interference reporting type for receiving a CQI and a PMI by the terminal. For example, a mode 1-0 indicates a wideband CQI, and no PMI is reported; a mode 1-1 indicates a wideband CQI and a wideband PMI; a mode 2-0 indicates a subband CQI, and no PMI is reported; a mode 2-1 indicates a subband CQI and a subband PMI. Other reporting types are not limited. In addition, a reporting type may also be configured for an RI, such as a wideband RI or a subband RI.

After receiving the periodic CSI interference reporting mode, the terminal may determine the frequency-domain information of the CSI interference measurement based on the CSI interference reporting mode, and further perform CSI interference measurement.

TABLE 4

| | | PMI Feedback Type | |
|---|---|---|---|
| | | No PMI | Single PMI |
| PUCCH CQI Feedback Type | Wideband (wideband CQI) | Mode 1-0 | Mode 1-1 |
| | UE Selected (subband CQI) | Mode 2-0 | Mode 2-1 |

Certainly, the frequency-domain information of the CSI interference measurement may also be indicated by using the representation forms in Table 2 to Table 4. In the foregoing implementation, there may be a correspondence between the frequency-domain information of the CSI interference measurement and the frequency-domain information of the CSI channel measurement. The correspondence may be that one or more types of frequency-domain information of channel measurement are corresponding to one or more types of frequency-domain information of interference measurement. If there are a plurality of types of frequency-domain information, a set of frequency-domain bandwidth indicated by the frequency-domain information may be used, or maximum or minimum frequency-domain bandwidth may be used. Channel measurement objects may be an RI, a PMI, a CQI, a CRI, and the like. An interference measurement object may be one or more of the foregoing channel measurement objects.

From a perspective of configuration by the base station, the base station may configure the frequency-domain information of the CSI interference measurement and the frequency-domain information of the CSI channel measurement based on a specific correspondence. For example, the channel measurement may be performed by using subband reporting information or wideband reporting information. If the frequency-domain information of the channel measurement is the subband reporting information, the interference measurement is also performed by using subband reporting information. If the channel measurement is performed by using the wideband reporting information, the interference measurement is also performed by using wideband reporting information. In this manner, the frequency-domain information of the interference measurement is the same as the frequency-domain information of the channel measurement. It should be noted that the frequency-domain information may indicate a frequency-domain location (corresponding to specific bandwidth).

Certainly, the frequency-domain information of the interference measurement may alternatively be different from the frequency-domain information of the channel measurement. There may be the following cases:

(1) A frequency-domain location of the interference measurement is larger than a frequency-domain location of the channel measurement.

(2) A frequency-domain location of the interference measurement partially overlaps with a frequency-domain location of the channel measurement. In this case, the frequency-domain location of the interference measurement is partially the same as the frequency-domain location of the channel measurement.

(3) A frequency-domain location of the interference measurement completely does not overlap with a frequency-domain location of the channel measurement. In this case, the frequency-domain location of the interference measurement is completely different from the frequency-domain location of the channel measurement.

In addition, when the first information is the CSI configuration information, the CSI configuration information may include the frequency-domain information of the CSI interference measurement and/or the frequency-domain information of the CSI channel measurement. The frequency-domain information of the CSI channel measurement and/or the frequency-domain information of the CSI interference measurement are subsets of full bandwidth or is a subset of full bandwidth.

A subset of the full bandwidth includes N resource units. N is greater than or equal to 1, and is less than a total quantity of resource units of the full bandwidth. The resource units may be resource blocks (RB). A resource block (RB) is a resource unit (resource granularity) in an existing LTE technology. In 5G or a subsequent protocol, a resource unit may not be defined based on an RB. The resource unit or the resource granularity may be specified in another manner, for example, may be related to a frame structure parameter (such as a subcarrier spacing or a cyclic shift length). This is not limited herein.

The subset of the full bandwidth may also be represented by subbands, in other words, the subset of the full bandwidth includes M subbands. M is greater than or equal to 1, and is less than a total quantity of subbands of the full bandwidth.

Specifically, a subband may be defined in the following manners.

(1) A subband size is based on a granularity of one RB.

(2) A subband size is based on a granularity of two RBs.

(3) A subband size is based on a granularity of P RBs, namely, an existing resource block group (RBG) size. P is an integer greater than or equal to 2, as shown in Table 5.

TABLE 5

| Channel bandwidth (size) $N_{RB}^{DL}$ | RBG (size) (P) |
|---|---|
| ≤10 | 1 |
| 11-26 | 2 |
| 27-63 | 3 |
| 64-110 | 4 |

(4) A subband size is based on a granularity of K, namely, an existing CSI measurement subband size (subband size). K is a positive integer, as shown in Table 6.

TABLE 6

| Channel bandwidth (size) $N_{RB}^{DL}$ | Subband Size (K) |
|---|---|
| 6-7 | NA |
| 8-10 | 4 |
| 11-26 | 4 |
| 27-63 | 6 |
| 64-110 | 8 |

Alternatively, there may be another subband definition. This is not limited herein.

Step S1002: The terminal measures, based on the frequency-domain information of the CSI interference measurement, a frequency-domain CSI interference measurement resource corresponding to the frequency-domain information of the CSI interference measurement.

Specifically, a reference signal may include a channel measurement reference signal and/or an interference measurement reference signal. The channel measurement reference signal is used by the terminal to measure a channel, and the interference measurement reference signal is used by the terminal to measure interference. In a CSI measurement process, the terminal may measure a channel based on the frequency-domain information of the channel measurement, and measure interference based on the frequency-domain information of the interference measurement.

In this embodiment of this application, measuring, by the terminal, the CSI interference measurement resource in the corresponding frequency-domain location is: measuring the interference measurement reference signal in the frequency-domain location.

Therefore, the terminal may obtain a CSI interference measurement result. Further, the terminal may measure a channel based on the frequency-domain information of the channel measurement, to obtain a CSI channel measurement result; and obtain CSI based on both the measurement result of the CSI channel measurement and the measurement result of the CSI interference measurement.

Further, interference measurement reference signals may include anon-zero power channel state information-reference signal (NZP CSI-RS) and a zero power channel state information-reference signal (ZP CSI-RS).

From a perspective of configuration by the base station, there is a correspondence between the frequency-domain information of the CSI interference measurement and the frequency-domain information of the CSI channel measurement. The correspondence may be predefined or preconfigured, and the definition or configuration needs to be known to both a base station side and a terminal side. For different CSI-RS resources, this embodiment of this application further provides a plurality of optional implementations for the foregoing correspondence. Examples are given below.

(1) When there are an NZP CSI-RS resource and a ZP CSI-RS resource, only frequency-domain information used when interference is measured based on the NZP CSI-RS resource is determined. When interference is measured based on the ZP CSI-RS resource, a full-bandwidth measurement manner is still used. That is, when interference is measured based on the NZP CSI-RS resource, the foregoing correspondence is used.

When the ZP CSI-RS resource is used for interference measurement, only interference power is measured. As a result, a measurement result is not very accurate. In addition, a difference between different frequency-domain locations is not very large. Therefore, accuracy may be improved through full-bandwidth averaging. When the NZP CSI-RS resource is used for interference measurement, channel matrix information may be specifically obtained, or precoding matrix information may be further obtained. Therefore, accurate measurement may be performed. In addition, a difference between measurement results in different frequency-domain locations may be relatively large. As a result, the full-bandwidth averaging manner may cause inaccurate interference measurement. Therefore, frequency-domain information of interference measurement for the NZP CSI-RS resource may be determined based on the frequency-domain information of the channel measurement. This reduces signaling overheads, and can also improve accuracy of CSI measurement.

(2) When there is a ZP CSI-RS resource but no NZP CSI-RS resource, frequency-domain information used when interference is measured based on the ZP CSI-RS resource is determined. That is, when interference is measured based on the ZP CSI-RS resource, the foregoing correspondence is used.

For example, an interference measurement resource includes only the ZP CSI-RS resource.

In a CS/CB scenario, during specific data scheduling, a neighboring cell may transmit data in different frequency bands by using different precoding matrices/beams. Different precoding matrices/beams for data transmission in the neighboring cell cause different degrees of interference to the terminal. For example, different precoding matrices/beams cause different signal energy strength in different locations, and further cause different degrees of interference in different frequency-domain locations. Therefore, when the ZP CSI-RS resource is used for interference measurement, the frequency-domain information may be determined based on the frequency-domain information of the channel measurement. Channel state information in a frequency-domain location corresponding to the frequency domain information obtained, to improve accuracy of channel state information measurement.

(3) When there are an NZP CSI-RS resource and a ZP CSI-RS resource, frequency-domain information used when interference is measured based on the NZP CSI-RS resource is determined, and frequency-domain information used when interference is measured based on the ZP CSI-RS resource is also determined. That is, when interference is measured on the NZP CSI-RS resource and the ZP CSI-RS resource, the foregoing correspondence is used.

If different frequency-domain information on the NZP CSI-RS resource is corresponding to different interference statuses, and different frequency-domain information on the ZP CSI-RS resource is also corresponding to different interference statuses, when the NZP CSI-RS resource is used for interference measurement, the frequency-domain information may be determined based on the frequency-domain information of the channel measurement; or when the ZP CSI-RS resource is used for interference measurement, the frequency-domain information may also be determined based on the frequency-domain information of the channel measurement. Channel state information in the frequency-domain information is correspondingly obtained, to improve accuracy of channel state information measurement.

(4) When there are an NZP CSI-RS resource and a ZP CSI-RS resource, only frequency-domain information used when interference is measured based on the ZP CSI-RS resource is determined. When interference is measured based on the NZP CSI-RS resource, a full-bandwidth measurement manner is still used.

Further, the NZP CSI-RS resource may be a Class A CSI-RS resource or a Class B CSI-RS resource.

Figure 11:
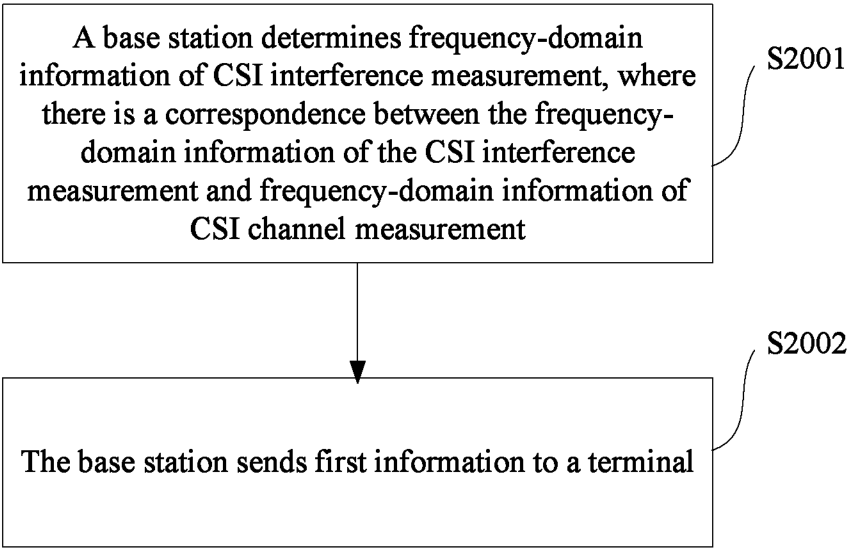
FIG. 11 is a flowchart of an interference measurement method according to an example embodiment.

Manner 2: As shown in FIG. 11, as an execution process on a base station side, in another embodiment provided in this application, an interference measurement method provided in this embodiment of this application may include the following steps.

Step S2001: A base station determines frequency-domain information of CSI interference measurement, where there is a correspondence between the frequency-domain information of the CSI interference measurement and frequency-domain information of CSI channel measurement.

In the foregoing implementation, there may be a correspondence between the frequency-domain information of the CSI interference measurement and the frequency-domain information of the CSI channel measurement. The correspondence may be that one or more types of frequency-domain information of channel measurement are corresponding to one or more types of frequency-domain information of interference measurement. If there are a plurality of types of frequency-domain information, a set of frequency-domain bandwidth indicated by the frequency-domain information may be used, or maximum or minimum frequency-domain bandwidth may be used. Channel measurement objects may be an RI, a PMI, a CQI, a CRI, and the like. An interference measurement object may be one or more of the foregoing channel measurement objects.

From a perspective of configuration by the base station, the base station may configure the frequency-domain information of the CSI interference measurement and the frequency-domain information of the CSI channel measurement based on a specific correspondence. For example, the channel measurement may be performed by using subband reporting information or wideband reporting information. If the frequency-domain information of the channel measurement is the subband reporting information, the interference measurement is also performed by using subband reporting information. If the channel measurement is performed by using the wideband reporting information, the interference measurement is also performed by using wideband reporting information. In this manner, the frequency-domain information of the interference measurement is the same as the frequency-domain information of the channel measurement. It should be noted that the frequency-domain information may indicate a frequency-domain location (corresponding to specific bandwidth).

Certainly, the frequency-domain information of the interference measurement may alternatively be different from the frequency-domain information of the channel measurement. There may be the following cases:

(1) A frequency-domain location of the interference measurement is larger than a frequency-domain location of the channel measurement.

(2) A frequency-domain location of the interference measurement partially overlaps with a frequency-domain location of the channel measurement. In this case, the frequency-domain location of the interference measurement is partially the same as the frequency-domain location of the channel measurement.

(3) A frequency-domain location of the interference measurement completely does not overlap with a frequency-domain location of the channel measurement. In this case, the frequency-domain location of the interference measurement is completely different from the frequency-domain location of the channel measurement.

Step S2002: The base station sends first information to a terminal, where there is a correspondence between the frequency-domain information of the CSI interference measurement and the frequency-domain information of the CSI channel measurement.

In addition, when the first information is the CSI configuration information, the CSI configuration information may include the frequency-domain information of the CSI interference measurement and/or the frequency-domain information of the CSI channel measurement. The frequency-domain information of the CSI channel measurement and/or the frequency-domain information of the CSI interference measurement are subsets of full bandwidth or is a subset of full bandwidth.

A subset of the full bandwidth includes N resource units. N is greater than or equal to 1, and is less than a total quantity of resource units of the full bandwidth. The resource units may be resource blocks (RB). A resource block (RB) is a resource unit (resource granularity) in an existing LTE technology. In 5G or a subsequent protocol, a resource unit may not be defined based on an RB. The resource unit or the resource granularity may be specified in another manner, for example, may be related to a frame structure parameter (such as a subcarrier spacing or a cyclic shift length). This is not limited herein.

The subset of the full bandwidth may also be represented by subbands, in other words, the subset of the full bandwidth includes M subbands. M is greater than or equal to 1, and is less than a total quantity of subbands of the full bandwidth.

Specifically, a subband may be defined in the following manners.

(1) A subband size is based on a granularity of one RB.

(2) A subband size is based on a granularity of two RBs.

(3) A subband size is based on a granularity of P RBs, namely, an existing RBG (Resource Block Group, resource block group) size. P is an integer greater than or equal to 2, as shown in Table 7.

TABLE 7

| Channel bandwidth (size) $N_{RB}^{DL}$ | RBG (size) (P) |
|---|---|
| ≤10 | 1 |
| 11-26 | 2 |
| 27-63 | 3 |
| 64-110 | 4 |

(4) A subband size is based on a granularity of K, namely, an existing CSI measurement subband size (subband size). K is a positive integer, as shown in Table 8.

TABLE 8

| Channel bandwidth (size) $N_{RB}^{DL}$ | Subband Size (K) |
|---|---|
| 6-7 | NA |
| 8-10 | 4 |
| 11-26 | 4 |
| 27-63 | 6 |
| 64-110 | 8 |

Alternatively, there may be another subband definition. This is not limited herein.

Specifically, a reference signal may include a channel measurement reference signal and/or an interference measurement reference signal. The channel measurement reference signal is used by the terminal to measure a channel, and the interference measurement reference signal is used by the terminal to measure interference. In a CSI measurement process, the terminal may measure a channel based on the frequency-domain information of the channel measurement, and measure interference based on the frequency-domain information of the interference measurement.

Further, interference measurement reference signals may include an non-zero power channel state information-reference signal (NZP CSI-RS) and a zero power channel state information-reference signal (ZP CSI-RS).

From a perspective of configuration by the base station, there is a correspondence between the frequency-domain information of the CSI interference measurement and the frequency-domain information of the CSI channel measurement. The correspondence may be predefined or preconfigured, and the definition or configuration needs to be known to both a base station side and a terminal side. For different CSI-RS resources, this embodiment of this application further provides a plurality of optional implementations for the foregoing correspondence. Examples are given below.

(1) When there are an NZP CSI-RS resource and a ZP CSI-RS resource, only frequency-domain information used when interference is measured based on the NZP CSI-RS resource is determined. When interference is measured based on the ZP CSI-RS resource, a full-bandwidth measurement manner is still used. That is, when interference is measured based on the NZP CSI-RS resource, the foregoing correspondence is used.

When the ZP CSI-RS resource is used for interference measurement, only interference power is measured. As a result, a measurement result is not very accurate. In addition, a difference between different frequency-domain locations is not very large. Therefore, accuracy may be improved through full-bandwidth averaging. When the NZP CSI-RS resource is used for interference measurement, channel matrix information may be specifically obtained, or precoding matrix information may be further obtained. Therefore, accurate measurement may be performed. In addition, a difference between measurement results in different frequency-domain locations may be relatively large. As a result, the full-bandwidth averaging manner may cause inaccurate interference measurement. Therefore, frequency-domain information of interference measurement for the NZP CSI-RS resource may be determined based on the frequency-domain information of the channel measurement. This reduces signaling overheads, and can also improve accuracy of CSI measurement.

(2) When there is a ZP CSI-RS resource but no NZP CSI-RS resource, frequency-domain information used when interference is measured based on the ZP CSI-RS resource is determined. That is, when interference is measured based on the ZP CSI-RS resource, the foregoing correspondence is used.

For example, an interference measurement resource includes only the ZP CSI-RS resource.

In a CS/CB scenario, during specific data scheduling, a neighboring cell may transmit data in different frequency bands by using different precoding matrices/beams. Different precoding matrices/beams for data transmission in the neighboring cell cause different degrees of interference to the terminal. For example, different precoding matrices/beams cause different signal energy strength in different locations, and further cause different degrees of interference in different frequency-domain locations. Therefore, when the ZP CSI-RS resource is used for interference measurement, the frequency-domain information may be determined based on the frequency-domain information of the channel measurement. Channel state information in the frequency-domain information is correspondingly obtained, to improve accuracy of channel state information measurement.

(3) When there are an NZP CSI-RS resource and a ZP CSI-RS resource, frequency-domain information used when interference is measured based on the NZP CSI-RS resource is determined, and frequency-domain information used when interference is measured based on the ZP CSI-RS resource is also determined. That is, when interference is measured on the NZP CSI-RS resource and the ZP CSI-RS resource, the foregoing correspondence is used.

If different frequency-domain information on the NZP CSI-RS resource is corresponding to different interference statuses, and different frequency-domain information on the ZP CSI-RS resource is also corresponding to different interference statuses, when the NZP CSI-RS resource is used for interference measurement, the frequency-domain information may be determined based on the frequency-domain information of the channel measurement; or when the ZP CSI-RS resource is used for interference measurement, the frequency-domain information may also be determined based on the frequency-domain information of the channel measurement. Channel state information in the frequency-domain information is correspondingly obtained, to improve accuracy of channel state information measurement.

(4) When there are an NZP CSI-RS resource and a ZP CSI-RS resource, only frequency-domain information used when interference is measured based on the ZP CSI-RS resource is determined. When interference is measured based on the NZP CSI-RS resource, a full-bandwidth measurement manner is still used.

Further, the NZP CSI-RS resource may be a Class A CSI-RS resource or a Class B CSI-RS resource.

It should be noted that, in this embodiment of this application, the base station may determine the frequency-domain information of the interference measurement based on the frequency-domain information of the channel measurement, or may simultaneously determine the frequency-domain information of the channel measurement and the frequency-domain information of the interference measurement. This embodiment of this application is not limited thereto.

Figure 12:
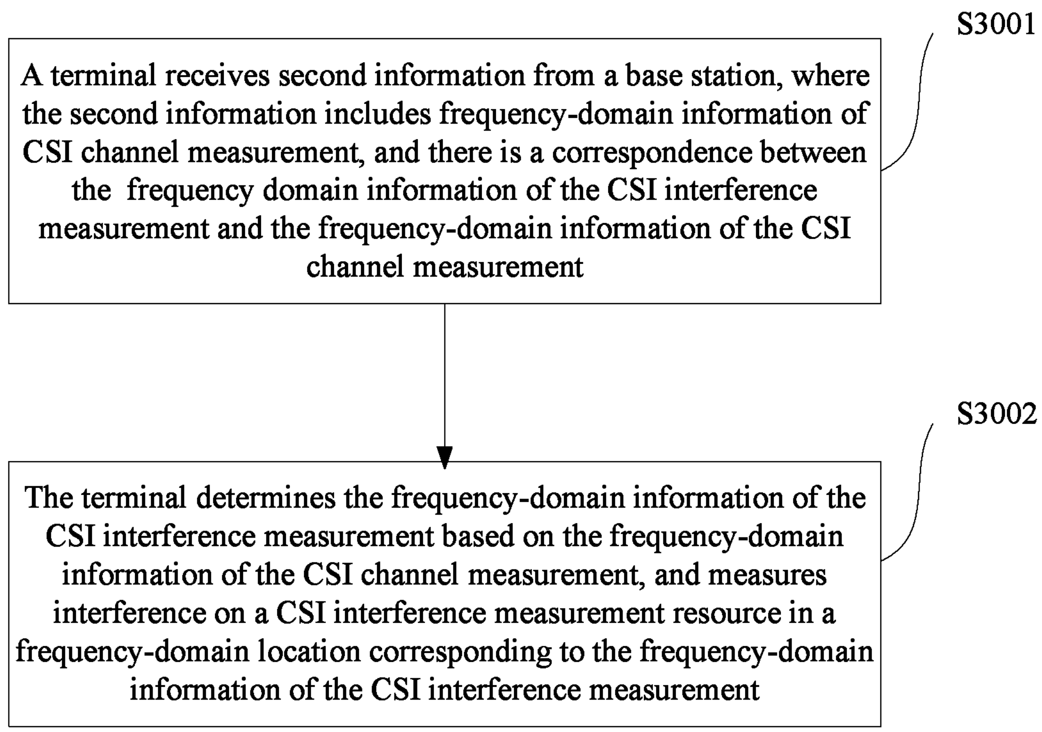
FIG. 12 is a flowchart of an interference measurement method according to an example embodiment.

Manner 3: As shown in FIG. 12, in another embodiment provided in this application, an interference measurement method provided in this embodiment of this application may include the following steps.

Step S3001: A terminal receives second information from a base station, where the second information includes frequency-domain information of CSI channel measurement, and there is a correspondence between frequency-domain information of the CSI interference measurement and the frequency-domain information of the CSI channel measurement.

Step S3002: The terminal determines the frequency-domain information of the CSI interference measurement based on the frequency-domain information of the CSI channel measurement, and measures interference on a CSI interference measurement resource in a frequency-domain location corresponding to the frequency-domain information of the CSI interference measurement.

The frequency-domain information of the channel measurement may be frequency-domain information of information related to the channel measurement. For example, the information related to the channel measurement may be at least one of the following channel measurement information: a rank indication (RI), a precoding matrix indicator (PMI), a CQI, and a CSI-RS Resource Indicator (CRI).

The frequency-domain information of the interference measurement may be frequency-domain information of information related to the interference measurement. For example, the information related to the interference measurement may be at least one of the following interference measurement information: a rank indication (RI), a precoding matrix indicator (PMI), a CQI, and a CSI-RS Resource Indicator (CRI).

In the foregoing implementation, there may be a correspondence between the frequency-domain information of the CSI interference measurement and the frequency-domain information of the CSI channel measurement. The correspondence may be that one or more types of frequency-domain information of channel measurement are corresponding to one or more types of frequency-domain information of interference measurement. If there are a plurality of types of frequency-domain information, a set of frequency-domain bandwidth indicated by the frequency-domain information may be used, or maximum or minimum frequency-domain bandwidth may be used. Channel measurement objects may be an RI, a PMI, a CQI, a CRI, and the like. An interference measurement object may be one or more of the foregoing channel measurement objects.

From a perspective of configuration by the base station, the base station may configure the frequency-domain information of the CSI interference measurement and the frequency-domain information of the CSI channel measurement based on a specific correspondence. For example, the channel measurement may be performed by using subband reporting information or wideband reporting information. If the frequency-domain information of the channel measurement is the subband reporting information, the interference measurement is also performed by using subband reporting information. If the channel measurement is performed by using the wideband reporting information, the interference measurement is also performed by using wideband reporting information. In this manner, the frequency-domain information of the interference measurement is the same as the frequency-domain information of the channel measurement. It should be noted that the frequency-domain information may indicate a frequency-domain location (corresponding to specific bandwidth).

Certainly, the frequency-domain information of the interference measurement may alternatively be different from the frequency-domain information of the channel measurement. There may be the following cases:

(1) A frequency-domain location of the interference measurement is larger than a frequency-domain location of the channel measurement.

(2) A frequency-domain location of the interference measurement partially overlaps with a frequency-domain location of the channel measurement. In this case, the frequency-domain location of the interference measurement is partially the same as the frequency-domain location of the channel measurement.

(3) A frequency-domain location of the interference measurement completely does not overlap with a frequency-domain location of the channel measurement. In this case, the frequency-domain location of the interference measurement is completely different from the frequency-domain location of the channel measurement.

The first information may be CSI configuration information. For example, in an LTE system, the CSI configuration information may include at least one of CSI reporting configuration information and reference signal configuration information. In NR (a 5G system), the CSI configuration information may include at least one of reference signal setting (RS setting) configuration information, CSI reporting setting configuration information, and CSI measurement setting configuration information.

On this basis, for example, the frequency-domain information of the CSI channel measurement may be carried in at least one of the foregoing information or any information having a similar function.

Specific representation forms of the frequency-domain information of the CSI channel measurement may be as follows: a CSI reporting mode in the CSI reporting configuration information or the CSI reporting setting configuration information, where the CSI reporting mode indicates the frequency-domain information of the CSI channel measurement; frequency-domain information, in the reference signal configuration information, of a CSI channel measurement reference signal; frequency-domain information, in the reference signal setting configuration information, of a CSI channel measurement reference signal; and frequency-domain information in the CSI measurement setting configuration information.

The CSI reporting mode is used as an example. For example, the CSI reporting mode that may be configured by the base station includes: a subband CSI reporting mode, a partial-band CSI reporting mode, a wideband CSI reporting mode, or the like. The base station sends the configured CSI reporting mode to the terminal. After receiving the CSI reporting mode, the terminal may determine the frequency-domain information of the CSI channel measurement based on the CSI reporting mode, and further perform CSI channel measurement.

Specifically, because the CSI reporting mode indicates the frequency-domain information of the CSI channel measurement, the terminal may determine the frequency-domain information of the interference measurement based on the correspondence between the frequency-domain information of the CSI interference measurement and the frequency-domain information of the CSI channel measurement. For another example, the frequency-domain information of the channel measurement may alternatively be indicated by the frequency-domain information of the CSI channel measurement reference signal. For details about how to perform indication, refer to the indication method in the foregoing embodiment.

Further, CSI reporting modes may include periodic, aperiodic, and semi-persistent CSI reporting modes, and the like. For example, for a periodic CSI reporting mode (Table 9 is used as an example), the base station may configure a reporting type for receiving a CQI and a PMI by the terminal. For example, a mode 1-0 indicates a wideband CQI, and no PMI is reported; a mode 1-1 indicates a wideband CQI and a wideband PMI; a mode 2-0 indicates a subband CQI, and no PMI is reported; a mode 2-1 indicates a subband CQI and a subband PMI. Other reporting types are not limited. In addition, a reporting type may also be configured for an RI, such as a wideband RI or a subband RI.

After receiving the periodic CSI reporting mode, the terminal may determine the frequency-domain information of the CSI channel measurement based on the CSI reporting mode, and further perform CSI channel measurement.

TABLE 9

| | | PMI Feedback Type | |
|---|---|---|---|
| | | No PMI | Single PMI |
| PUCCH CQI Feedback Type | Wideband (wideband CQI) | Mode 1-0 | Mode 1-1 |
| | UE Selected (subband CQI) | Mode 2-0 | Mode 2-1 |

Certainly, the frequency-domain information of the CSI channel measurement may also be indicated by using the representation forms in Table 2 to Table 4. The terminal determines the frequency-domain information of the CSI interference measurement based on the correspondence between the frequency-domain information of the channel measurement and the frequency-domain information of the interference measurement.

In addition, when the second information is the CSI configuration information, the CSI configuration information may include the frequency-domain information of the CSI channel measurement. The frequency-domain information of the CSI channel measurement is a subset of full bandwidth.

A subset of the full bandwidth includes N resource units. N is greater than or equal to 1, and is less than a total quantity of resource units of the full bandwidth. The resource units may be resource blocks (RB). A resource block (RB) is a resource unit (resource granularity) in an existing LTE technology. In 5G or a subsequent protocol, a resource unit may not be defined based on an RB. The resource unit or the resource granularity may be specified in another manner, for example, may be related to a frame structure parameter (such as a subcarrier spacing or a cyclic shift length). This is not limited herein.

The subset of the full bandwidth may also be represented by subbands, in other words, the subset of the full bandwidth includes M subbands. M is greater than or equal to 1, and is less than a total quantity of subbands of the full bandwidth.

Specifically, a subband may be defined in the following manners.

(1) A subband size is based on a granularity of one RB.

(2) A subband size is based on a granularity of two RBs.

(3) A subband size is based on a granularity of P RBs, namely, an existing RBG (resource block group) size. P is an integer greater than or equal to 2, as shown in Table 10.

TABLE 10

| Channel bandwidth (size) $N_{RB}^{DL}$ | RBG (size) (P) |
|---|---|
| ≤10 | 1 |
| 11-26 | 2 |
| 27-63 | 3 |
| 64-110 | 4 |

(4) A subband size is based on a granularity of K, namely, an existing CSI measurement subband size (subband size). K is a positive integer, as shown in Table 11.

TABLE 11

| Channel bandwidth (size) $N_{RB}^{DL}$ | Subband Size (K) |
|---|---|
| 6-7 | NA |
| 8-10 | 4 |
| 11-26 | 4 |
| 27-63 | 6 |
| 64-110 | 8 |

Alternatively, there may be another subband definition. This is not limited herein.

The frequency-domain information of the CSI channel measurement is corresponding to the frequency-domain information of the CSI interference measurement in three manners. Refer to the foregoing embodiment. Details are not described herein again.

Specifically, a reference signal may include a channel measurement reference signal and/or an interference measurement reference signal. The channel measurement reference signal is used by the terminal to measure a channel, and the interference measurement reference signal is used by the terminal to measure interference. In a CSI measurement process, the terminal may measure a channel based on the frequency-domain information of the channel measurement, and measure interference based on the frequency-domain information of the interference measurement.

In this embodiment of this application, measuring, by the terminal, the CSI interference measurement resource in the corresponding frequency-domain location is: measuring the interference measurement reference signal in the frequency-domain location.

The terminal may obtain a CSI interference measurement result. Further, the terminal may measure a channel based on the frequency-domain information of the channel measurement, to obtain a CSI channel measurement result; and obtain CSI based on both the measurement result of the CSI channel measurement and the measurement result of the CSI interference measurement.

Further, optionally, the terminal may send the CSI to the base station.

Figure 13:
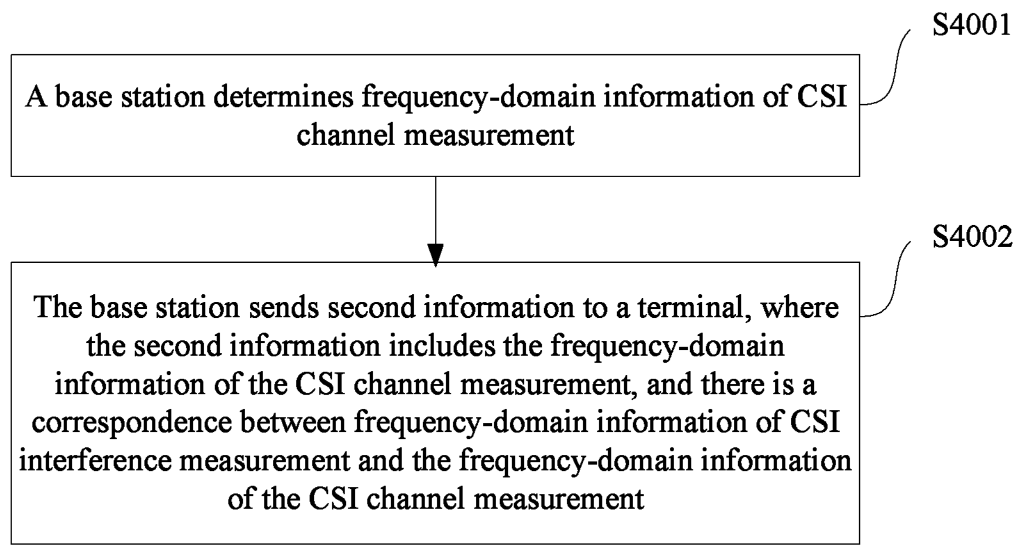
FIG. 13 is a flowchart of an interference measurement method according to an example embodiment.

Manner 4: As shown in FIG. 13, in another embodiment provided in this application, an interference measurement method provided in this embodiment may include the following steps.

Step S4001: A base station determines frequency-domain information of CSI channel measurement.

Step S4002: The base station sends second information to a terminal, where the second information includes the frequency-domain information of the CSI channel measurement, and there is a correspondence between frequency-domain information of CSI interference measurement and the frequency-domain information of the CSI channel measurement.

The frequency-domain information of the channel measurement may be frequency-domain information of information related to the channel measurement. For example, the information related to the channel measurement may be at least one of the following channel measurement information: a rank indication (RI), a precoding matrix indicator (PMI), a CQI, and a CSI-RS Resource Indicator (CRI).

The frequency-domain information of the interference measurement may be frequency-domain information of information related to the interference measurement. For example, the information related to the interference measurement may be at least one of the following interference measurement information: a rank indication (RI), a precoding matrix indicator (PMI), a CQI, and a CSI-RS Resource Indicator (CRI).

The frequency-domain information of the channel measurement may be frequency-domain information of information related to the channel measurement. For example, the information related to the channel measurement may be at least one of the following channel measurement information: a rank indication (RI), a precoding matrix indicator (PMI), a CQI, and a CSI-RS Resource Indicator (CRI).

The frequency-domain information of the interference measurement may be frequency-domain information of information related to the interference measurement. For example, the information related to the interference measurement may be at least one of the following interference measurement information: a rank indication (RI), a precoding matrix indicator (PMI), a CQI, and a CSI-RS Resource Indicator (CRI).

In the foregoing implementation, there may be a correspondence between the frequency-domain information of the CSI interference measurement and the frequency-domain information of the CSI channel measurement. The correspondence may be that one or more types of frequency-domain information of channel measurement are corresponding to one or more types of frequency-domain information of interference measurement. If there are a plurality of types of frequency-domain information, a set of frequency-domain bandwidth indicated by the frequency-domain information may be used, or maximum or minimum frequency-domain bandwidth may be used. Channel measurement objects may be an RI, a PMI, a CQI, a CRI, and the like. An interference measurement object may be one or more of the foregoing channel measurement objects.

From a perspective of configuration by the base station, the base station may configure the frequency-domain information of the CSI interference measurement and the frequency-domain information of the CSI channel measurement based on a specific correspondence. For example, the channel measurement may be performed by using subband reporting information or wideband reporting information. If the frequency-domain information of the channel measurement is the subband reporting information, the interference measurement is also performed by using subband reporting information. If the channel measurement is performed by using the wideband reporting information, the interference measurement is also performed by using wideband reporting information. In this manner, the frequency-domain information of the interference measurement is the same as the frequency-domain information of the channel measurement. It should be noted that the frequency-domain information may indicate a frequency-domain location (corresponding to specific bandwidth).

Certainly, the frequency-domain information of the interference measurement may alternatively be different from the frequency-domain information of the channel measurement. There may be the following cases:

(1) A frequency-domain location of the interference measurement is larger than a frequency-domain location of the channel measurement.

(2) A frequency-domain location of the interference measurement partially overlaps with a frequency-domain location of the channel measurement. In this case, the frequency-domain location of the interference measurement is partially the same as the frequency-domain location of the channel measurement.

(3) A frequency-domain location of the interference measurement completely does not overlap with a frequency-domain location of the channel measurement. In this case, the frequency-domain location of the interference measurement is completely different from the frequency-domain location of the channel measurement.

The first information may be CSI configuration information. For example, in an LTE system, the CSI configuration information may include at least one of CSI reporting configuration information and reference signal configuration information. In NR (a 5G system), the CSI configuration information may include at least one of reference signal setting (RS setting) configuration information, CSI reporting setting configuration information, and CSI measurement setting configuration information.

On this basis, for example, the frequency-domain information of the CSI channel measurement may be carried in at least one of the foregoing information or any information having a similar function.

Specific representation forms of the frequency-domain information of the CSI channel measurement may be as follows: a CSI reporting mode in the CSI reporting configuration information or the CSI reporting setting configuration information, where the CSI interference reporting mode indicates the frequency-domain information of the CSI channel measurement; frequency-domain information, in the reference signal configuration information, of a CSI channel measurement reference signal; frequency-domain information, in the reference signal setting configuration information, of a CSI channel measurement reference signal; and frequency-domain information in the CSI measurement setting configuration information.

The CSI reporting mode is used as an example. For example, the CSI reporting mode that may be configured by the base station includes: a subband CSI reporting mode, a partial-band CSI reporting mode, a wideband CSI reporting mode, or the like. The base station sends the configured CSI reporting mode to the terminal. After receiving the CSI reporting mode, the terminal may determine the frequency-domain information of the CSI channel measurement based on the CSI reporting mode, and further perform CSI channel measurement.

Specifically, because the CSI reporting mode indicates the frequency-domain information of the CSI channel measurement, the terminal may determine the frequency-domain information of the interference measurement based on the correspondence between the frequency-domain information of the CSI interference measurement and the frequency-domain information of the CSI channel measurement.

For another example, the frequency-domain information of the CSI channel measurement reference signal may alternatively be used. For details about how to perform indication, refer to the indication method in the foregoing embodiment.

Further, CSI reporting modes may include periodic, aperiodic, and semi-persistent CSI reporting modes, and the like. For example, for a periodic CSI reporting mode (Table 12 is used as an example), the base station may configure a reporting type for receiving a CQI and a PMI by the terminal. For example, a mode 1-0 indicates a wideband CQI (wideband CQI), and no PMI is reported; a mode 1-1 indicates a wideband CQI and a wideband PMI; a mode 2-0 indicates a subband CQI, and no PMI is reported; a mode 2-1 indicates a subband CQI and a subband PMI. Other reporting types are not limited. In addition, a reporting type may also be configured for an RI, such as a wideband RI or a subband RI.

After receiving the periodic CSI interference reporting mode, the terminal may determine the frequency-domain information of the CSI channel measurement based on the CSI reporting mode, and further perform CSI interference measurement.

TABLE 12

| | | PMI Feedback Type | |
|---|---|---|---|
| | | No PMI | Single PMI |
| PUCCH CQI Feedback Type | Wideband (wideband CQI) | Mode 1-0 | Mode 1-1 |
| | UE Selected (subband CQI) | Mode 2-0 | Mode 2-1 |

Certainly, the frequency-domain information of the CSI channel measurement may also be indicated by using the representation forms in Table 2 to Table 4. The terminal determines the frequency-domain information of the CSI interference measurement based on the correspondence between the frequency-domain information of the channel measurement and the frequency-domain information of the interference measurement.

In addition, when the second information is the CSI configuration information, the CSI configuration information may include the frequency-domain information of the CSI channel measurement. The frequency-domain information of the CSI channel measurement is a subset of full bandwidth.

A subset of the full bandwidth includes N resource units. N is greater than or equal to 1, and is less than a total quantity of resource units of the full bandwidth. The resource units may be resource blocks (RB). A resource block (RB) is a resource unit (resource granularity) in an existing LTE technology. In 5G or a subsequent protocol, a resource unit may not be defined based on an RB. The resource unit or the resource granularity may be specified in another manner, for example, may be related to a frame structure parameter (such as a subcarrier spacing or a cyclic shift length). This is not limited herein.

The subset of the full bandwidth may also be represented by subbands, in other words, the subset of the full bandwidth includes M subbands. M is greater than or equal to 1, and is less than a total quantity of subbands of the full bandwidth.

Specifically, a subband may be defined in the following manners.

(1) A subband size is based on a granularity of one RB.

(2) A subband size is based on a granularity of two RBs.

(3) A subband size is based on a granularity of P RBs, namely, an existing RBG (resource block group) size. P is an integer greater than or equal to 2, as shown in Table 13.

TABLE 13

| Channel bandwidth (size) $N_{RB}^{DL}$ | RBG (size) (P) |
|---|---|
| ≤10 | 1 |
| 11-26 | 2 |
| 27-63 | 3 |
| 64-110 | 4 |

(4) A subband size is based on a granularity of K, namely, an existing CSI measurement subband size (subband size). K is a positive integer, as shown in Table 14.

TABLE 14

| Channel bandwidth (size) $N_{RB}^{DL}$ | Subband Size (K) |
|---|---|
| 6-7 | NA |
| 8-10 | 4 |
| 11-26 | 4 |
| 27-63 | 6 |
| 64-110 | 8 |

Alternatively, there may be another subband definition. This is not limited herein.

The frequency-domain information of the CSI channel measurement is corresponding to the frequency-domain information of the CSI interference measurement in three manners. Refer to the foregoing embodiment. Details are not described herein again.

Specifically, a reference signal may include a channel measurement reference signal and/or an interference measurement reference signal. The channel measurement reference signal is used by the terminal to measure a channel, and the interference measurement reference signal is used by the terminal to measure interference. In a CSI measurement process, the terminal may measure a channel based on the frequency-domain information of the channel measurement, and measure interference based on the frequency-domain information of the interference measurement.

In this embodiment of this application, measuring, by the terminal, the CSI interference measurement resource in the corresponding frequency-domain location is: measuring the interference measurement reference signal in the frequency-domain location.

The terminal may obtain a CSI interference measurement result. Further, the terminal may measure a channel based on the frequency-domain information of the channel measurement, to obtain a CSI channel measurement result; and obtain CSI based on both the measurement result of the CSI channel measurement and the measurement result of the CSI interference measurement.

Further, optionally, the terminal may send the CSI to the base station. Optionally, the base station may receive the CSI sent by the terminal.

It should be noted that, in this embodiment of this application, the base station may determine the frequency-domain information of the interference measurement based on the frequency-domain information of the channel measurement, or may simultaneously determine the frequency-domain information of the channel measurement and the frequency-domain information of the interference measurement. This embodiment of this application is not limited thereto.

With reference to the foregoing embodiments, in another embodiment provided in this application, the frequency-domain information of the CSI channel measurement and the frequency-domain information of the CSI interference measurement may be exchanged between base stations. In the foregoing embodiments, information may be sent by using at least one of higher layer signaling and physical layer signaling.

In this embodiment provided in this application, reporting manners with different frequency-domain granularities may be used for CSI reporting, for example, wideband CSI reporting, partial-band CSI reporting, and subband CSI reporting.

For the wideband CSI reporting, a wideband granularity may be determined based on a capability of receiving a downlink signal by a terminal. A wideband location may be configured by a base station. This scenario may be applied to beam management.

For the partial-band CSI reporting, a granularity may be terminal-level configurable bandwidth, or may be determined based on frame structure parameter information or scheduling time unit information.

For the subband CSI reporting, a subband size is determined by dividing bandwidth or partial bandwidth into a plurality of subbands. The subband CSI reporting may be applied to frequency-domain selection and scheduling, subband precoding and measurement, and the like.

With reference to the foregoing embodiments, in this embodiment provided in this application, at least one of the following information may be configured for obtaining CSI:

(1) CSI reporting setting configuration information, used to indicate information related to CSI reporting. For example, the CSI reporting setting configuration information may include at least one of a CSI reporting parameter (such as an RI, a PMI, a CQI, or a CRI), a CSI reporting type (a CSI type I CSI Type I or a CSI type II CSI Type II), codebook configuration information, time-domain information, frequency-domain granularity information (such as wideband reporting, partial-band reporting, or subband reporting), and restricted measurement configuration information (activation/deactivation information, or the like).

(2) Reference signal resource setting (resource setting) configuration information, used to indicate information related to a CSI measurement reference signal. For example, the reference signal setting configuration information may include one or more CSI-RS resource sets. Each set may include one or more pieces of CSI-RS resource configuration information. The configuration information includes at least one of location information of a mapped time-frequency resource, a quantity of antenna ports, time-domain information (which may be periodic, aperiodic, semi-persistent, or the like), and the like; and may further include RS type indication information.

(3) CSI measurement setting configuration information, used to indicate information related to a CSI measurement link (link). For example, the CSI measurement setting configuration information may include one or more pieces of link information. Each piece of link information includes a CSI reporting set identifier, a reference signal set identifier, and a measurement value indication (e.g., a channel or interference). One CSI reporting set may be associated with one or more reference signal sets. A plurality of CSI reporting sets may also be associated with one reference signal set.

It should be noted that, in this embodiment provided in this application, one CSI measurement set may have one or more CSI reporting sets, and the one or more CSI reporting sets are selected from at least one reference signal set. One or more CSI resources are selected from at least one CSI-RS resource set. Specifically, indication information related to frequency-domain information may be placed in at least one of the foregoing three pieces of configuration information.

The interference measurement method provided in the foregoing embodiments of this application is applicable to a coordination scenario. For example, downlink CoMP mainly includes joint transmission (JT), coordinated scheduling (CS) and coordinated beamforming (CB), and dynamic point selection (DPS)/dynamic point blanking (DPB). JT is classified into coherent JT and incoherent JT.

Figure 14:
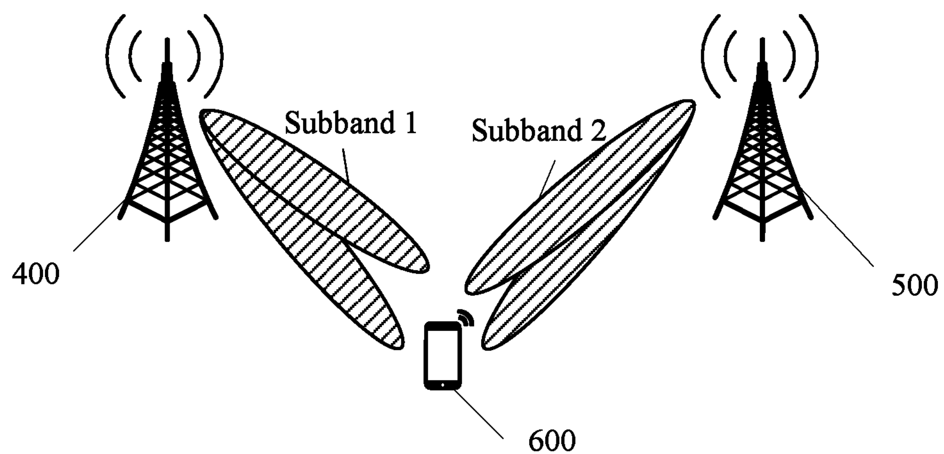
FIG. 14 is a schematic diagram of an interference measurement scenario according to an example embodiment.

As shown in FIG. 14, when a base station 400 and a base station 500 perform joint transmission in a JT scenario, resources of the base station 400 and the base station 500 may be in three cases: The resources of the two base stations completely overlap, partially overlap, and do not overlap. If the resources of the two base stations overlap, inter-flow (or inter-layer or inter-codeword) interference is caused. For example, to measure CSI when the resources of the two base stations completely overlap, a subband CSI reporting mode may be configured. A terminal determines subband frequency-domain information when measuring a channel, and also uses the same subband frequency-domain information of the channel measurement when measuring interference. In this way, an inter-flow (or inter-layer or inter-codeword) interference status may be obtained through measurement when the resources overlap. In this case, an interference measurement resource is completely the same as a channel measurement resource. Specifically, in this embodiment of this application, when interference measurement resources are classified into an NZP CSI-RS resource and a ZP CSI-RS resource, the NZP CSI-RS resource is used to measure inter-flow (or inter-layer or inter-codeword) interference, and the ZP CSI-RS resource is used to measure interference caused by another base station different from the base station 400 and the base station 500. In addition, interference measurement resource information of the NZP CSI-RS resource may be the same as channel measurement resource information, and full-bandwidth measurement may be performed when the ZP CSI-RS resource is used to measure interference.

If the resources of the two base stations partially overlap, there is inter-flow interference in an overlapping part, and there is no inter-flow (or inter-layer or inter-codeword) interference in a non-overlapping part. Therefore, to accurately measure CSI, a terminal may be configured to ignore inter-flow (or inter-layer or inter-codeword) interference in channel measurement of the non-overlapping part, and consider inter-flow (or inter-layer or inter-codeword) interference in channel measurement of the overlapping part. Specifically, when CSI in data transmission of a base station 1 is measured, the terminal may be configured to skip measuring inter-flow (or inter-layer or inter-codeword) interference on a channel measurement subband 1, and consider inter-flow (or inter-layer or inter-codeword) interference measurement for a base station 2 on the measurement subband 2. In this case, an interference measurement resource is partially the same as a channel measurement resource. Specifically, when interference measurement resources are classified into an NZP CSI-RS and a ZP CSI-RS, the NZP CSI-RS may be used to measure inter-flow (or inter-layer or inter-codeword) interference, and the ZP CSI-RS may be used to measure interference caused by another base station different from the base station 1 and the base station 2. In addition, interference measurement resource information of the NZP CSI-RS may be the same as channel measurement resource information, and full-bandwidth measurement may be performed when the ZP CSI-RS is used to measure interference. For example, when the subband 1 is measured, only the ZP CSI-RS is configured to measure interference through full-bandwidth measurement. When the subband 2 is measured, the NZP CSI-RS may be configured to measure inter-flow (or inter-layer or inter-codeword) interference on the subband 2. When the ZP CSI-RS is configured to measure interference, full-bandwidth measurement may be configured.

If the resources of the two base stations do not overlap at all, there is no inter-flow interference in a non-overlapping part. Therefore, to accurately measure CSI, a terminal may be configured to ignore inter-flow interference in channel measurement of the non-overlapping part. Specifically, when CSI in data transmission of a base station 1 is measured, the terminal may be configured to measure a channel on a channel measurement subband 1, and interference may be measured through full-bandwidth measurement. In this case, an interference measurement resource is partially the same as a channel measurement resource. Specifically, frequency-domain information of the channel measurement may be configured as the subband 1, and full-bandwidth measurement may be configured when the ZP CSI-RS is configured to measure interference.

The NZP CSI-RS resource may be a Class A CSI-RS resource or a Class B CSI-RS resource.

Figure 15:
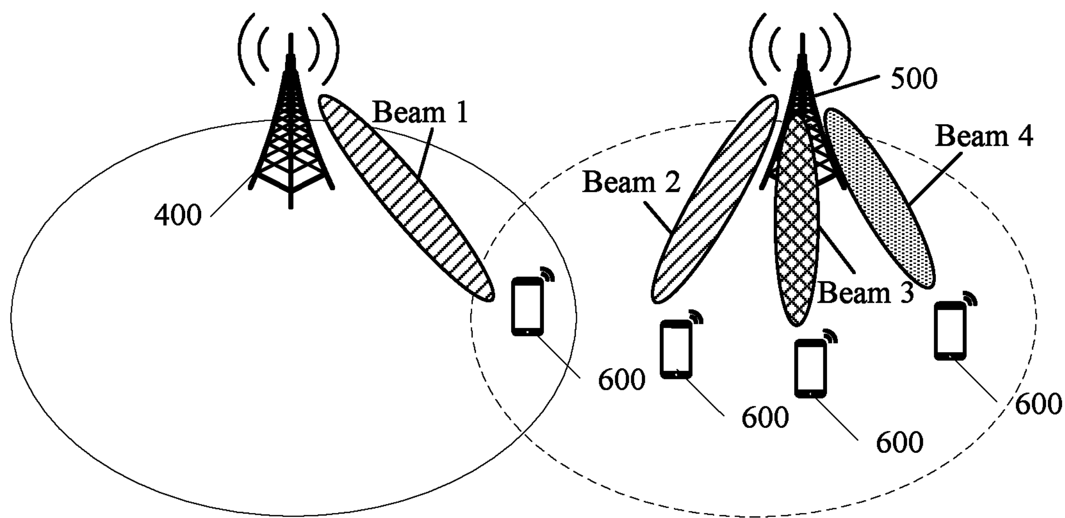
FIG. 15 is a schematic diagram of an interference measurement scenario according to an example embodiment.

The interference measurement method provided in the foregoing embodiments of this application is applicable to a CS/CB scenario. In this embodiment provided in this application, as shown in FIG. 15, when a base station 1 and a base station 2 perform CS/CB transmission, an interference status varies when a neighboring base station performs transmission in different beam directions. For example, in the figure, interference of a beam 2 is greater than interference of a beam 3 and interference of a beam 4. In addition, during data scheduling, the neighboring base station performs transmission by using different precoding matrices or beams when performing scheduling for different users on different frequency-domain resources. Therefore, to accurately measure CSI information, a subband CSI reporting mode may be configured. A terminal determines subband frequency-domain information when measuring a channel, and also uses the same subband frequency-domain information of the channel measurement when measuring interference. In this way, an interference status on a corresponding frequency band may be obtained through measurement. In this case, an interference measurement resource is completely the same as a channel measurement resource. Specifically, when interference measurement resources are classified into an NZP CSI-RS and a ZP CSI-RS, the NZP CSI-RS may be used to measure interference of an intra-frequency directional beam, and the ZP CSI-RS may be used to measure interference caused by another base station different from the base station 1 and the base station 2. In addition, interference measurement resource information of the NZP CSI-RS may be the same as channel measurement resource information, and full-bandwidth measurement may be performed when the ZP CSI-RS is used to measure interference. In addition, if a base station can determine information about a beam direction of a neighboring cell when transmitting data to the terminal, the base station may configure frequency-domain information of interference measurement to be frequency-domain information of data or a signal in the beam direction. For example, the TP 2 performs transmission for the beam 2 by using a frequency band 1, performs transmission for the beam 3 by using a frequency band 2, and performs transmission for the beam 4 by using a frequency band 3. The base station configures a frequency band on which the terminal measures a channel to be a frequency band X. If an interference beam is the beam 2, a frequency band for interference measurement may be configured to be the frequency band 1; if an interference beam is the beam 3, a frequency band for interference measurement may be configured to be the frequency band 2; or if an interference beam is the beam 4, a frequency band for interference measurement may be configured to be the frequency band 3. The frequency band X for channel measurement may be the same or different from the frequency band for interference measurement. When the frequency band X for channel measurement is different from the frequency band for interference measurement, frequency-domain offset information may be configured for implementation. For example, if the frequency band 1 is used for the channel measurement and the interference measurement, frequency-domain offset information of the interference measurement may be configured to be 0; if the frequency band 1 is used for the channel measurement, and the frequency band 2 is used for the interference measurement, frequency-domain offset information of the interference measurement may be configured to be 1; or if the frequency band 1 is used for the channel measurement, and the frequency band 3 is used for the interference measurement, frequency-domain offset information of the interference measurement may be configured to be 2. The terminal may determine the frequency-domain information of the interference measurement based on the frequency-domain information of the channel measurement and the frequency-domain offset information. (New) In this case, the interference measurement resource may be an NZP CSI-RS resource or a ZP CSI-RS resource. The NZP CSI-RS resource may be a Class A CSI-RS resource or a Class B CSI-RS resource.

Figure 16:
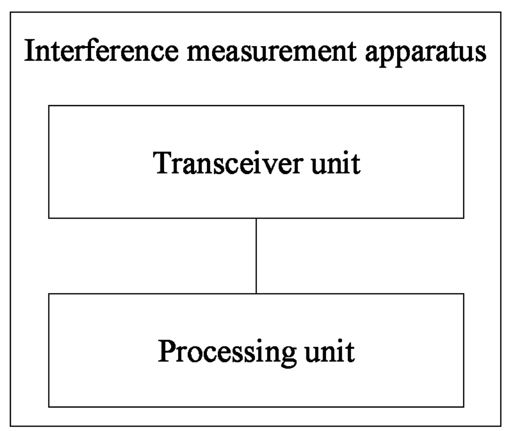
FIG. 16 is a schematic diagram of an interference measurement apparatus according to an example embodiment.

In another embodiment provided in this application, an interference measurement apparatus is further provided. As shown in FIG. 16, the apparatus is applied to a terminal, and includes: a transceiver unit, configured to receive first information from a base station, where the first information includes frequency-domain information of CSI interference measurement, and there is a correspondence between the frequency-domain information of the CSI interference measurement and frequency-domain information of CSI channel measurement; and a processing unit, configured to measure, based on the frequency-domain information of the CSI interference measurement, interference on a CSI interference measurement resource in a frequency-domain location corresponding to the frequency-domain information of the CSI interference measurement.

In a possible implementation provided in this embodiment of this application, the first information is CSI configuration information, the CSI configuration information includes the frequency-domain information of the CSI channel measurement, and the frequency-domain information of the CSI channel measurement and/or the frequency-domain information of the CSI interference measurement are subsets of full bandwidth or is a subset of full bandwidth.

In another embodiment provided in this application, an interference measurement apparatus is further provided. As shown in FIG. 16, the apparatus is applied to a base station, and includes: a processing unit, configured to determine frequency-domain information of CSI interference measurement, where there is a correspondence between the frequency-domain information of the CSI interference measurement and frequency-domain information of CSI channel measurement; and a transceiver unit, configured to send first information to a terminal, where the first information includes the frequency-domain information of the CSI interference measurement.

In a possible implementation provided in this embodiment of this application, the frequency-domain information of the CSI channel measurement and/or the frequency-domain information of the CSI interference measurement are subsets of full bandwidth or is a subset of full bandwidth.

In another embodiment provided in this application, an interference measurement apparatus is further provided. As shown in FIG. 16, the apparatus is applied to a terminal, and includes: a transceiver unit, configured to receive second information from a base station, where the second information includes frequency-domain information of CSI channel measurement, and there is a correspondence between frequency-domain information of CSI interference measurement and the frequency-domain information of the CSI channel measurement; and a processing unit, configured to: determine the frequency-domain information of the CSI interference measurement based on the frequency-domain information of the CSI channel measurement, and measure interference on a CSI interference measurement resource in a frequency-domain location corresponding to the frequency-domain information of the CSI interference measurement.

In a possible implementation provided in this embodiment of this application, the frequency-domain information of the CSI channel measurement and/or the frequency-domain information of the CSI interference measurement are subsets of full bandwidth or is a subset of full bandwidth.

In another embodiment provided in this application, an interference measurement apparatus is further provided. As shown in FIG. 16, the apparatus is applied to a base station, and includes: a processing unit, configured to obtain frequency-domain information of CSI channel measurement; and a transceiver unit, configured to send second information to terminal, where the second information includes the frequency-domain information of the CSI channel measurement, and there is a correspondence between frequency-domain information of the CSI interference measurement and the frequency-domain information of the CSI channel measurement.

In a possible implementation provided in this embodiment of this application, the frequency-domain information of CSI interference measurement and the frequency-domain information of the CSI channel measurement are subsets of full bandwidth.

In the interference measurement apparatus provided in this embodiment of this application:

In a possible implementation provided in this embodiment of this application, that there is a correspondence between the frequency-domain information of the CSI interference measurement and frequency-domain information of CSI channel measurement includes: the frequency-domain information of the CSI interference measurement is the same as the frequency-domain information of the CSI channel measurement; or the frequency-domain information of the CSI interference measurement is partially the same as the frequency-domain information of the CSI channel measurement; or the frequency-domain information of the CSI interference measurement is different from the frequency-domain information of the CSI channel measurement.

In a possible implementation provided in this embodiment of this application, the CSI interference measurement resource includes a non-zero power channel state information-reference signal NZP CSI-RS resource and/or a zero power channel state information-reference signal ZP CSI-RS resource.

In a possible implementation provided in this embodiment of this application, a subset of the full bandwidth includes N resource units, and N is greater than or equal to 1, and is less than a total quantity of resource units of the full bandwidth; or a subset of the full bandwidth includes M subbands, and M is greater than or equal to 1, and is less than a total quantity of subbands of the full bandwidth.

In a possible implementation provided in this embodiment of this application, the CSI channel measurement includes one or a combination of the following: channel quality indicator CQI measurement, precoding matrix indicator PMI measurement, rank indication RI measurement, and CRI measurement.

In addition, an embodiment of this application provides a rate matching method, applied to a first network device.

A. The rate matching method includes: obtaining, by the first network device, rate configuration information that includes second frequency-domain indication information and that is sent by a second network device, where the rate configuration information is used to instruct the first network device to perform rate matching, and the second frequency-domain indication information is used to indicate a frequency-domain location in which the first network device performs rate matching; determining, by the first network device based on the rate configuration information, a resource location of a reference signal in the frequency-domain location corresponding to the second frequency-domain indication information; and performing, by the first network device, rate matching on received data based on the resource location.

B. The method according to A, where the second frequency-domain indication information includes channel division information, and the channel division information is used to indicate a manner of dividing channel bandwidth into a plurality of resource blocks.

C. The method according to A, further including: dividing, by the first network device, channel bandwidth into a plurality of resource blocks in a preset division manner.

D. The method according to any one of A to C, where the second frequency-domain indication information includes: each of the plurality of resource blocks of the channel bandwidth is corresponding to one rate matching identifier; and the determining a resource location of a reference signal in the frequency-domain location corresponding to the second frequency-domain indication information includes: obtaining, by the first network device, the rate matching identifier corresponding to each of the plurality of resource blocks of the channel bandwidth, where the rate matching identifier includes a first rate matching identifier and a second rate matching identifier; and determining, by the first network device, a resource location of a reference signal on a resource block whose rate matching identifier in the channel bandwidth is the first rate matching identifier.

E. The method according to any one of A to C, where the second frequency-domain indication information includes an information identifier of a resource block on which rate matching is to be performed; and the determining a resource location of a reference signal in the frequency-domain location corresponding to the second frequency-domain indication information includes: obtaining, by the first network device, the information identifier of the resource block on which rate matching is to be performed, where the information identifier includes a frequency-domain location; and determining, by the first network device, a resource location of a reference signal on a resource block corresponding to the frequency-domain location.

F. The method according to A, where the obtaining, by a first network device, rate configuration information that includes second frequency-domain indication information and that is sent by a second network device includes: obtaining, by the first network device by using radio resource control RRC or physical layer signaling, the rate configuration information that includes the second frequency-domain indication information and that is sent by the second network device.

In addition, on a second network device side, an embodiment of this application further provides a rate matching method, applied to a second network device:

A. A rate matching method, including: sending, by a second network device to a first network device, rate configuration information that includes second frequency-domain indication information, where the rate configuration information is used to instruct the first network device to perform rate matching, and the second frequency-domain indication information is used to indicate a frequency-domain location in which the first network device performs rate matching, so that the first network device determines, based on the rate configuration information, a resource location of a reference signal in the frequency-domain location corresponding to the second frequency-domain indication information, and performs rate matching on received data based on the resource location.

B. The method according to A, where the second frequency-domain indication information includes channel division information, and the channel division information is used to indicate a manner of dividing channel bandwidth into a plurality of resource blocks.

C. The method according to A, where the second frequency-domain indication information includes: each of the plurality of resource blocks of the channel bandwidth is corresponding to one rate matching identifier.

D. The method according to C, where the rate matching identifier includes a first rate matching identifier and a second measurement identifier, the first measurement identifier is used to instruct the first network device to perform rate matching on data on a resource block whose rate matching identifier in the channel bandwidth is the first measurement identifier, and the second measurement identifier is used to instruct the first network device not to perform rate matching on data on a resource block whose rate matching identifier in the channel bandwidth is the second measurement identifier.

E. The method according to A, where the second frequency-domain indication information includes an information identifier of a resource block on which rate matching is to be performed.

F. The method according to E, where the information identifier includes a frequency-domain location, and the information identifier is used to instruct the first network device to determine a resource location of a reference signal on a resource block corresponding to the frequency-domain location, and instruct the first network device to perform rate matching on received data based on the resource location.

G The method according to A, where the sending, by a second network device to a first network device, rate configuration information that includes second frequency-domain indication information includes: sending, by the second network device to the first network device by using radio resource control RRC or physical layer signaling, the rate configuration information that includes the second frequency-domain indication information.

Based on the foregoing descriptions of the method embodiments, a person skilled in the art may clearly understand that this application may be implemented by software and a necessary general-purpose hardware platform, or certainly, may be implemented by hardware. In many cases, the implementation by using the software and the necessary general-purpose hardware platform is a better implementation. Based on such an understanding, the technical solutions of this application essentially, or a part contributing to the prior art may be implemented in a form of a software product. The computer software product is stored in a storage medium, and includes several instructions for instructing a computer device (which may be a personal computer, a server, a network device, or the like) to perform all steps or some of steps of the methods described in the embodiments of this application. The storage medium includes any medium that can store program code, such as a read-only memory (ROM), a random access memory (RAM), a magnetic disk, or an optical disc.

Figure 17:
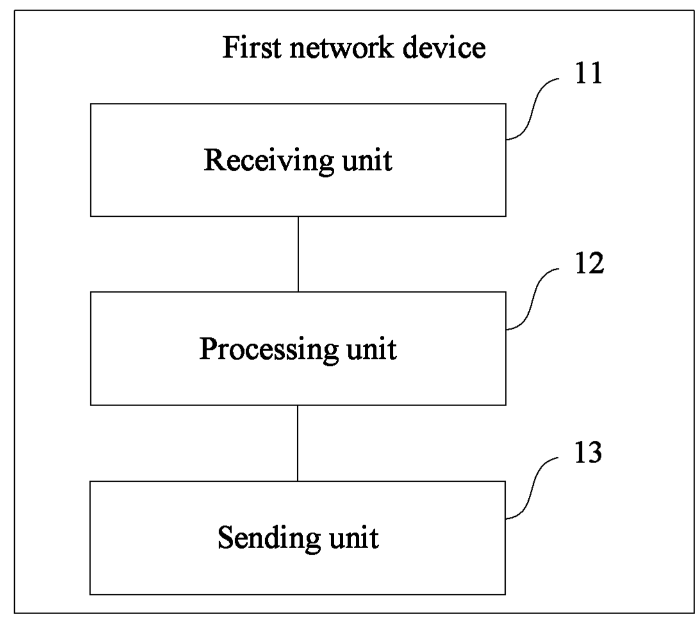
FIG. 17 is a schematic diagram of a first network device according to an example embodiment.

In addition, in an implementation of the foregoing embodiments, an embodiment of this application further provides a first network device. As shown in FIG. 17, the first network device includes: a receiving unit 11, configured to obtain CSI configuration information that includes first frequency-domain indication information and that is sent by a second network device, where the CSI configuration information includes the first frequency-domain indication information, the CSI configuration information is used to instruct the first network device to perform CSI measurement, and the first frequency-domain indication information is used to indicate a frequency-domain location in which the first network device performs CSI measurement; and a processing unit 12, configured to measure, based on the CSI configuration information, a reference signal in the frequency-domain location indicated by the first frequency-domain indication information.

The first frequency-domain indication information includes channel division information, and the channel division information is used to indicate a manner of dividing channel bandwidth into a plurality of resource blocks.

In an optional embodiment, the processing unit 12 is further configured to divide the channel bandwidth into the plurality of resource blocks in a preset division manner.

In an optional embodiment, the first frequency-domain indication information includes a frequency-domain measurement identifier corresponding to each of the plurality of resource blocks of the channel bandwidth.

The processing unit 12 is further configured to obtain the frequency-domain measurement identifier corresponding to each of the plurality of resource blocks of the channel bandwidth, where the frequency-domain measurement identifier includes a first measurement identifier and a second measurement identifier. The processing unit 12 is further configured to measure a reference signal on a resource block whose frequency-domain measurement identifier in the channel bandwidth is the first measurement identifier.

In an optional embodiment, the first frequency-domain indication information includes an information identifier of a to-be-measured resource block. The processing unit 12 is further configured to obtain the information identifier of the to-be-measured resource block, where the information identifier is used to indicate a frequency-domain location of a measurement resource. The processing unit 12 is further configured to measure a resource block corresponding to the frequency-domain location.

In an optional embodiment, the processing unit 12 is further configured to obtain, by using radio resource control RRC or physical layer signaling, the CSI configuration information that includes the first frequency-domain indication information and that is sent by the second network device.

In an optional embodiment, the reference signal includes a channel measurement reference signal and/or an interference measurement reference signal.

In an optional embodiment, the processing unit 12 is further configured to: obtain a measurement result corresponding to a target resource block in the plurality of resource blocks, and use the measurement result as CSI. In an optional embodiment, the processing unit 12 is further configured to: obtain a measurement result corresponding to a target resource block in the plurality of resource blocks, and process, in a preset manner, the measurement result corresponding to the target resource block, to obtain CSI.

In an optional embodiment, the first network device further includes a sending unit 13, configured to send the CSI to the second network device.

Figure 21:
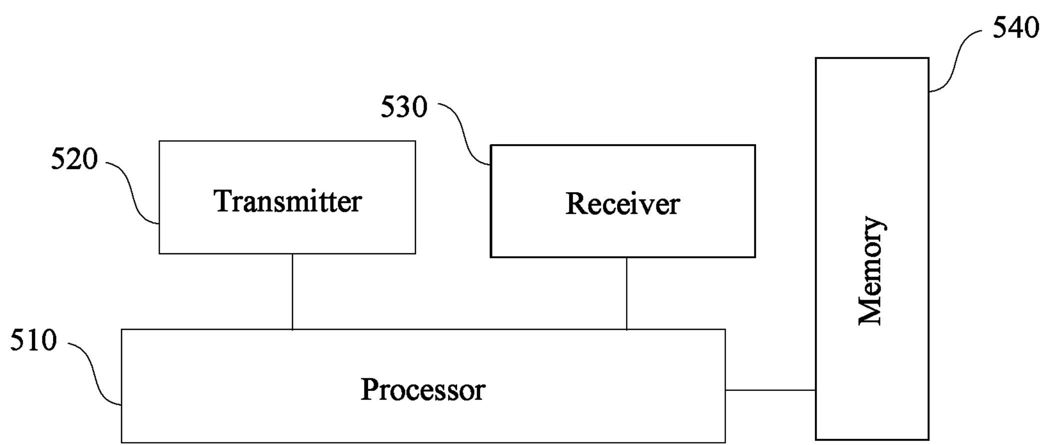
FIG. 21 is a schematic diagram of a device according to another example embodiment.

In an optional embodiment, the processing unit 12 may be a processor 510, the receiving unit 11 may be a receiver 530, and the sending unit 13 may be a transmitter 520. The receiver 530 or the transmitter 520 may be replaced with a transceiver. In addition, the first network device may include a memory 540. The memory 540 is configured to store program code and data of a network device. Specifically, as shown in FIG. 21, the network device includes the processor 510, the transmitter 520, the receiver 530, and the memory 540.

Figure 18:
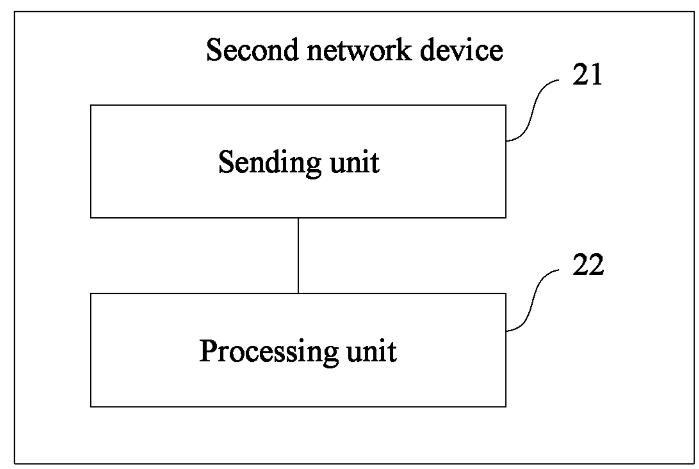
FIG. 18 is a schematic diagram of a second network device according to an example embodiment.

In an implementation of the foregoing embodiments, an embodiment of this application further provides a second network device. As shown in FIG. 18, the second network device includes: a sending unit 21, configured to send CSI configuration information that includes first frequency-domain indication information, where the CSI configuration information includes the first frequency-domain indication information, the CSI configuration information is used to instruct a first network device to perform CSI measurement, and the first frequency-domain indication information is used to indicate a frequency-domain location in which the first network device performs CSI measurement, so that the first network device measures a reference signal based on the received CSI configuration information.

In an optional embodiment, the first frequency-domain indication information includes channel division information, and the channel division information is used to indicate a manner of dividing channel bandwidth into a plurality of resource blocks.

In an optional embodiment, the second network device further includes a processing unit 22, configured to divide channel bandwidth between the second network device and the first network device into a plurality of resource blocks in a preset division manner.

In an optional embodiment, the first frequency-domain indication information includes a frequency-domain measurement identifier corresponding to each of the plurality of resource blocks of the channel bandwidth, so that the first network device measures the resource block of the channel bandwidth based on the frequency-domain measurement identifier.

In an optional embodiment, the first frequency-domain indication information includes an information identifier of a to-be-measured resource block, so that the first network device measures a corresponding resource block of the channel bandwidth based on the information identifier.

In an optional embodiment, the processing unit 22 is configured to send, to the first network device by using radio resource control RRC or physical layer signaling, the CSI configuration information that includes the first frequency-domain indication information.

In an optional embodiment, the reference signal includes a channel measurement reference signal and/or an interference measurement reference signal.

In an optional embodiment, the sending unit 21 is configured to obtain CSI sent by the first network device.

In an optional embodiment, the CSI includes: a measurement result that is corresponding to a target resource block in the plurality of resource blocks and that is obtained by the first network device; or a result that is obtained by the first network device by obtaining a measurement result corresponding to a target resource block in the plurality of resource blocks, and processing, in a preset manner, the measurement result corresponding to the target resource block.

In an optional embodiment, the processing unit 22 may be a processor 510, and the sending unit 21 may be a transmitter 520. The receiver 530 or the transmitter 520 may be replaced with a transceiver. In addition, the second network device may include a memory 540. The memory 540 is configured to store program code and data of a network device. Specifically, as shown in FIG. 21, the network device includes the processor 510, the transmitter 520, the receiver 530, and the memory 540.

Figure 19:
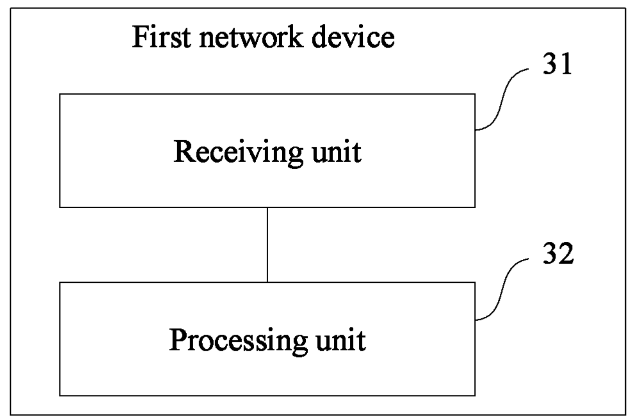
FIG. 19 is a schematic diagram of a first network device according to another example embodiment.

In an implementation of the foregoing embodiments, an embodiment of this application further provides a first network device. As shown in FIG. 19, the first network device includes: a receiving unit 31, configured to obtain rate configuration information that includes second frequency-domain indication information and that is sent by a second network device, where the rate configuration information includes the second frequency-domain indication information, the rate configuration information is used to instruct the first network device to perform rate matching, and the second frequency-domain indication information is used to indicate a frequency-domain location in which the first network device performs rate matching; and a processing unit 32, configured to determine, based on the rate configuration information, a resource location of a reference signal in the frequency-domain location corresponding to the second frequency-domain indication information, where the processing unit 32 is further configured perform rate matching on received data based on the resource location.

In an optional embodiment, the second frequency-domain indication information includes channel division information, and the channel division information is used to divide channel bandwidth into a plurality of resource blocks.

In an optional embodiment, the processing unit 32 is further configured to divide the channel bandwidth into the plurality of resource blocks in a preset division manner.

In an optional embodiment, the second frequency-domain indication information includes: each of the plurality of resource blocks of the channel bandwidth is corresponding to one rate matching identifier. The processing unit 32 is further configured to obtain the rate matching identifier corresponding to each of the plurality of resource blocks of the channel bandwidth, where the rate matching identifier includes a first rate matching identifier and a second rate matching identifier. The processing unit 32 is further configured to determine a resource location of a reference signal on a resource block whose rate matching identifier in the channel bandwidth is the first rate matching identifier.

In an optional embodiment, the second frequency-domain indication information includes an information identifier of a resource block on which rate matching is to be performed. The processing unit 32 is further configured to obtain the information identifier of the resource block on which rate matching is to be performed, where the information identifier includes a frequency-domain location. The processing unit 32 is further configured to determine a resource location of a reference signal on a resource block corresponding to the frequency-domain location.

In an optional embodiment, the processing unit 32 is further configured to obtain, by using radio resource control RRC or physical layer signaling, the rate configuration information that includes the second frequency-domain indication information and that is sent by the second network device.

In an optional embodiment, the processing unit 32 may be a processor 510, and the receiving unit 31 may be a receiver 530. The receiver 530 or the transmitter 520 may be replaced with a transceiver. In addition, the first network device may include a memory 540. The memory 540 is configured to store program code and data of a network device. Specifically, as shown in FIG. 21, the network device includes the processor 510, the transmitter 520, the receiver 530, and the memory 540.

Figure 20:
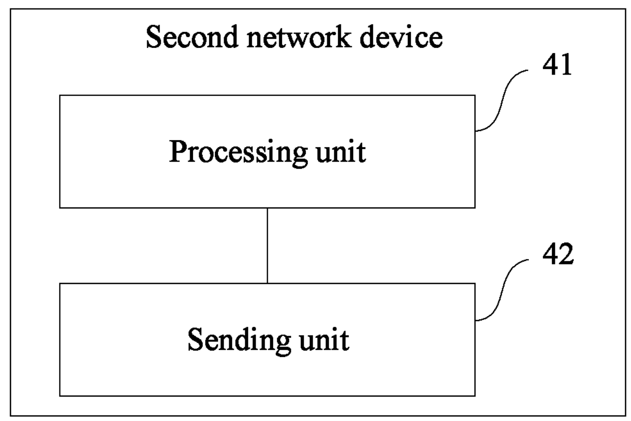
FIG. 20 is a schematic diagram of a second network device according to another example embodiment.

In an implementation of the foregoing embodiments, an embodiment of this application further provides a second network device. A shown in FIG. 20, the second network device includes: a processing unit 41, configured to determine rate configuration information, where the rate configuration information includes second frequency-domain indication information, the rate configuration information is used to instruct a first network device to perform rate matching, and the second frequency-domain indication information is used to indicate a frequency-domain location in which the first network device performs rate matching; and a sending unit 42, configured to send the rate configuration information that includes the second frequency-domain indication information, so that the first network device performs rate matching based on the received rate configuration information.

In an optional embodiment, the second frequency-domain indication information includes channel division information, and the channel division information is used to divide channel bandwidth into a plurality of resource blocks.

In an optional embodiment, the second frequency-domain indication information includes: each of the plurality of resource blocks of the channel bandwidth is corresponding to one rate matching identifier, so that the first network device performs rate matching on data on the resource block of the channel bandwidth based on the rate matching identifier.

In an optional embodiment, the second frequency-domain indication information includes an information identifier of a resource block on which rate matching is to be performed, so that the first network device performs rate matching on data on the corresponding resource block of the channel bandwidth based on the information identifier.

In an optional embodiment, the sending unit 42 is configured to send, to the first network device by using radio resource control RRC or physical layer signaling, the rate configuration information that includes the second frequency-domain indication information.

In an optional embodiment, the processing unit 41 may be a processor 510, and the sending unit 42 may be a transmitter 520. The receiver 530 or the transmitter 520 may be replaced with a transceiver. In addition, the second network device may include a memory 540. The memory 540 is configured to store program code and data of a network device. Specifically, as shown in FIG. 21, the network device includes the processor 510, the transmitter 520, the receiver 530, and the memory 540.

For the apparatuses in the foregoing embodiments, specific manners of performing operations by each module are described in detail in the embodiments related to the methods, and details are not described herein.

It may be understood that this application may be applied to environments or configurations of various universal or dedicated computing systems, for example, a personal computer, a server computer, a handheld device or a portable device, a flat panel device, a multi-processor system, a microprocessor-based system, a set-top box, a programmable consumer electronic device, a network PC, a minicomputer, a mainframe computer, and a distributed computing environment including any one of the foregoing systems or devices.

This application may be described in the general context of executable computer instructions executed by a computer, for example, a program module. Generally, the program module includes a routine, a program, an object, a component, a data structure, and the like for performing a particular task or implementing a particular abstract data type. This application may be practiced in distributed computing environments in which tasks are performed by remote processing devices that are connected through a communications network. In a distributed computing environment, program modules may be located in both local and remote computer storage media including storage devices.

It should be noted that in this specification, relational terms such as "first" and "second" are only used to distinguish one entity or operation from another, and do not necessarily require or imply that any actual relationship or sequence exists between these entities or operations. In addition, the term "including", "comprising", or any other variant thereof is intended to cover a non-exclusive inclusion, so that a process, a method, an article, or a device that includes a list of elements not only includes those elements but also includes other elements which are not expressly listed, or further includes elements inherent to such a process, method, article, or device. An element preceded by "includes a . . . " does not, without more constraints, preclude the existence of additional identical elements in the process, method, article, or device that includes the element.

After going through the specification and practicing the invention disclosed herein, a person skilled in the art can easily figure out other implementation solutions of this application. This application is intended to cover any variations, usages, or adaptive changes of this application. These variations, usages, or adaptive changes conform to general principles of this application, and include common knowledge or a conventional technical means that is in the technical field and that is not disclosed in this application. The specification and the embodiments are merely considered as examples. The real scope and spirit of this application are denoted in the following claims.

It should be understood that this application is not limited to the aforementioned precise structures shown in the accompanying drawings, and various modifications and changes may be made without departing from the scope of this application. The scope of this application is limited only by the claims.

What is claimed is:

1. A method for obtaining a channel state information (CSI) carried out by a first network device, the method comprising:

obtaining a CSI configuration information comprising a first frequency-domain indication information sent by a second network device, wherein the CSI configuration information instructs the first network device to perform a CSI measurement, and wherein the first frequency-domain indication information indicates a frequency-domain location for performing the CSI measurement; and measuring, based on the first frequency-domain indication information of the CSI configuration information, a reference signal in the frequency-domain location to obtain the CSI, wherein the first frequency-domain indication information comprises a frequency-domain measurement identifier corresponding to each of the plurality of resource blocks of the channel bandwidth; and wherein the measuring the reference signal in the frequency-domain location comprises:

obtaining the frequency-domain measurement identifier corresponding to each of the plurality of resource blocks of the channel bandwidth, wherein the frequency-domain measurement identifier is set to:

a first measurement identifier to indicate a resource block to be measured, and a second measurement identifier to indicate a resource block to not be measured; and measuring the reference signal on a resource block whose frequency-domain measurement identifier in the channel bandwidth is set to the first measurement identifier.

2. The method according to claim 1, wherein the first frequency-domain indication information comprises channel division information, and wherein the channel division information indicates a manner of dividing a channel bandwidth into a plurality of resource blocks.

3. The method according to claim 1, further comprising:

dividing the channel bandwidth into a plurality of resource blocks in a preset division manner.

4. A method for obtaining a channel state information (CSI) carried out by a first network device, the method comprising:

obtaining a CSI configuration information comprising a first frequency-domain indication information sent by a second network device, wherein the CSI configuration information instructs the first network device to perform a CSI measurement, and wherein the first frequency-domain indication information indicates a frequency-domain location for performing the CSI measurement; and measuring, based on the first frequency-domain indication information of the CSI configuration information, a reference signal in the frequency-domain location to obtain the CSI, wherein the first frequency-domain indication information comprises an information identifier of a to-be-measured resource block; and wherein the measuring the reference signal in the frequency-domain location comprises:

obtaining the information identifier of the to-be-measured resource block, wherein the information identifier is used to indicate the frequency-domain location of a measurement resource; and measuring the reference signal on a resource block corresponding to the frequency-domain location.

5. The method according to claim 1, wherein the obtaining the CSI configuration information comprises:

obtaining the CSI configuration information using at least one of the group consisting of: a radio resource control (RRC) and a physical layer signaling.

6. A method for obtaining a channel state information (CSI) carried out by a first network device, the method comprising:

obtaining a CSI configuration information comprising a first frequency-domain indication information sent by a second network device, wherein the CSI configuration information instructs the first network device to perform a CSI measurement, and wherein the first frequency-domain indication information indicates a frequency-domain location for performing the CSI measurement; and measuring, based on the first frequency-domain indication information of the CSI configuration information, a reference signal in the frequency-domain location to obtain the CSI, wherein the first frequency-domain indication information comprises channel division information, and wherein the channel division information indicates a manner of dividing a channel bandwidth into a plurality of resource blocks, wherein the method further comprises sending the CSI to the second network device, and wherein the CSI is obtained by performing one of the group consisting of:

obtaining CSI corresponding to a target resource block in the plurality of resource blocks; and obtaining CSI corresponding to a target resource block in the plurality of resource blocks, processing, in a preset manner, the CSI corresponding to the target resource block, and using a processing result as the CSI.

7. A network device, comprising:

a processor, and a non-transitory computer-readable medium including computer-executable instructions, wherein the processor is configured to execute the computer-executable instructions to carry out a method for obtaining a channel state information (CSI), the method including:

obtaining a CSI configuration information comprising a first frequency-domain indication information sent by a second network device, wherein the CSI configuration information instructs a first network device to perform a CSI measurement, and wherein the first frequency-domain indication information indicates a frequency-domain location for performing the CSI measurement; and measuring, based on the first frequency-domain indication information of the CSI configuration information, a reference signal in the frequency-domain location to obtain the CSI, wherein:

a subset of the full bandwidth comprises N resource units, and N is greater than or equal to 1, and is less than a total quantity of resource units of the full bandwidth; or a subset of the full bandwidth comprises M subbands, and M is greater than or equal to 1, and is less than a total quantity of subbands of the full bandwidth.

8. The network device according to claim 7, wherein the first frequency-domain indication information specifies a full bandwidth or a subset of the full bandwidth.

9. The network device according to claim 7, wherein the CSI measurement comprises one or a combination of the group consisting of: a channel quality indicator (CQI) measurement, a precoding matrix indicator (PMI) measurement, a rank indication (RI) measurement, and a CRI measurement.

10. The network device of claim 7, wherein the first frequency-domain indication information comprises a channel bandwidth division information, and wherein the channel bandwidth division information indicates a manner of dividing a channel bandwidth into a plurality of resource blocks.

11. The method of claim 4, wherein the first frequency-domain indication information comprises a channel bandwidth division information, and wherein the channel bandwidth division information indicates a manner of dividing a channel bandwidth into a plurality of resource blocks.

12. A network device, comprising:

a processor, and a non-transitory computer-readable medium including computer-executable instructions, wherein the processor is configured to execute the computer-executable instructions to carry out a method for obtaining a channel state information (CSI), the method including:

obtaining a CSI configuration information comprising a first frequency-domain indication information sent by a second network device, wherein the CSI configuration information instructs the first network device to perform a CSI measurement, and wherein the first frequency-domain indication information indicates a frequency-domain location for performing the CSI measurement; and measuring, based on the first frequency-domain indication information of the CSI configuration information, a reference signal in the frequency-domain location to obtain the CSI, wherein the first frequency-domain indication information comprises a frequency-domain measurement identifier corresponding to each of the plurality of resource blocks of the channel bandwidth; and wherein the measuring the reference signal in the frequency-domain location comprises:

obtaining the frequency-domain measurement identifier corresponding to each of the plurality of resource blocks of the channel bandwidth, wherein the frequency-domain measurement identifier is set to:

a first measurement identifier to indicate a resource block to be measured, and a second measurement identifier to indicate a resource block to not be measured; and measuring the reference signal on a resource block whose frequency-domain measurement identifier in the channel bandwidth is set to the first measurement identifier.

13. The network device of claim 12, wherein the first frequency-domain indication information comprises a channel bandwidth division information, and wherein the channel bandwidth division information indicates a manner of dividing a channel bandwidth into a plurality of resource blocks.

14. A network device, comprising:

a processor, and a non-transitory computer-readable medium including computer-executable instructions, wherein the processor is configured to execute the computer-executable instructions to carry out a method for obtaining a channel state information (CSI), the method including:

obtaining a CSI configuration information comprising a first frequency-domain indication information sent by a second network device, wherein the CSI configuration information instructs the first network device to perform a CSI measurement, and wherein the first frequency-domain indication information indicates a frequency-domain location for performing the CSI measurement; and measuring, based on the first frequency-domain indication information of the CSI configuration information, a reference signal in the frequency-domain location to obtain the CSI, wherein the first frequency-domain indication information comprises an information identifier of a to-be-measured resource block; and wherein the measuring the reference signal in the frequency-domain location comprises:

obtaining the information identifier of the to-be-measured resource block, wherein the information identifier is used to indicate the frequency-domain location of a measurement resource; and measuring the reference signal on a resource block corresponding to the frequency-domain location.

15. The network device of claim 14, wherein the first frequency-domain indication information comprises a channel bandwidth division information, and wherein the channel bandwidth division information indicates a manner of dividing a channel bandwidth into a plurality of resource blocks.

16. A network device, comprising:

a processor, and a non-transitory computer-readable medium including computer-executable instructions, wherein the processor is configured to execute the computer-executable instructions to carry out a method for obtaining a channel state information (CSI), the method including:

obtaining a CSI configuration information comprising a first frequency-domain indication information sent by a second network device, wherein the CSI configuration information instructs the first network device to perform a CSI measurement, and wherein the first frequency-domain indication information indicates a frequency-domain location for performing the CSI measurement; and measuring, based on the first frequency-domain indication information of the CSI configuration information, a reference signal in the frequency-domain location to obtain the CSI, wherein the first frequency-domain indication information comprises channel division information, and wherein the channel division information indicates a manner of dividing a channel bandwidth into a plurality of resource blocks, wherein the method further comprises sending the CSI to the second network device, and wherein the CSI is obtained by performing one of the group consisting of:

obtaining CSI corresponding to a target resource block in the plurality of resource blocks; and obtaining CSI corresponding to a target resource block in the plurality of resource blocks, processing, in a preset manner, the CSI corresponding to the target resource block, and using a processing result as the CSI.

17. The network device of claim 16, wherein the first frequency-domain indication information comprises a channel bandwidth division information, and wherein the channel bandwidth division information indicates a manner of dividing a channel bandwidth into a plurality of resource blocks.

18. A method for obtaining a channel state information (CSI) carried out by a first network device, the method comprising:

obtaining a CSI configuration information comprising a first frequency-domain indication information sent by a second network device, wherein the CSI configuration information instructs a first network device to perform a CSI measurement, and wherein the first frequency-domain indication information indicates a frequency-domain location for performing the CSI measurement; and measuring, based on the first frequency-domain indication information of the CSI configuration information, a reference signal in the frequency-domain location to obtain the CSI, wherein:

a subset of the full bandwidth comprises N resource units, and N is greater than or equal to 1, and is less than a total quantity of resource units of the full bandwidth; or a subset of the full bandwidth comprises M subbands, and M is greater than or equal to 1, and is less than a total quantity of subbands of the full bandwidth.

19. The method of claim 18, wherein the first frequency-domain indication information comprises a channel bandwidth division information, and wherein the channel bandwidth division information indicates a manner of dividing a channel bandwidth into a plurality of resource blocks.

* * * * *